US012129077B2

(12) United States Patent
Farruggio

(10) Patent No.: US 12,129,077 B2
(45) Date of Patent: Oct. 29, 2024

(54) APPARATUS AND METHOD FOR HOLDING OBJECTS IN A CONTAINER

(71) Applicant: Matthew J. Farruggio, San Diego, CA (US)

(72) Inventor: Matthew J. Farruggio, San Diego, CA (US)

(*) Notice: Subject to any disclaimer, the term of this patent is extended or adjusted under 35 U.S.C. 154(b) by 866 days.

(21) Appl. No.: 13/757,704

(22) Filed: Feb. 1, 2013

(65) Prior Publication Data

US 2013/0213985 A1 Aug. 22, 2013

Related U.S. Application Data

(60) Provisional application No. 61/624,210, filed on Apr. 13, 2012, provisional application No. 61/594,860, filed on Feb. 3, 2012, provisional application No. 61/594,982, filed on Feb. 3, 2012.

(51) Int. Cl.

| | |
|---|---|
| ***B65D 25/02*** | (2006.01) |
| ***B65B 5/04*** | (2006.01) |
| ***B67D 3/00*** | (2006.01) |

(52) U.S. Cl.
CPC ................ *B65D 25/02* (2013.01); *B65B 5/04* (2013.01); *B67D 3/00* (2013.01); *B67D 3/0083* (2013.01); *B67D 3/0096* (2013.01)

(58) Field of Classification Search
CPC .... B65D 25/02; B65D 5/04; B65D 2577/042; B65D 2577/04
USPC .......................................... 220/735; 206/221
See application file for complete search history.

(56) References Cited

U.S. PATENT DOCUMENTS

| | | | | | |
|---|---|---|---|---|---|
| 85,449 | A * | 12/1868 | Jackson | C02F 1/003 | 210/266 |
| 607,673 | A * | 7/1898 | Armstrong | F25D 31/002 | 62/319 |
| 867,109 | A * | 9/1907 | Cathrea | | |
| 1,535,927 | A | 4/1925 | Look | | |
| 2,088,376 | A | 7/1937 | Kaskey | | |
| 2,591,606 | A * | 4/1952 | Reed | A47G 19/22 | 210/469 |
| 2,685,175 | A * | 8/1954 | Hull | F25D 31/002 | 222/146.1 |
| 3,664,463 | A * | 5/1972 | Kuethe | F16F 7/125 | 188/268 |

(Continued)

FOREIGN PATENT DOCUMENTS

EP 2 218 644 A1 8/2010

OTHER PUBLICATIONS

Written Opinion of the International Searching Authority for International Application No. PCT/US2013/024527, filed Feb. 1, 2013, Written Opinion of the International Searching Authority mailed Apr. 15, 2013 (4 pgs.).

(Continued)

*Primary Examiner* — Anthony D Stashick
*Assistant Examiner* — Blaine G Neway
(74) *Attorney, Agent, or Firm* — Lewis Roca Rothgerber Christie LLP

(57) ABSTRACT

A container and a method of holding an object in a container. A container includes an outer wall defining a cavity and having an opening to an outside of the container; and a holding device in the cavity and including a wall spaced apart from the outer wall and defining a gap therebetween for holding an object between the wall and the outer wall.

28 Claims, 22 Drawing Sheets

(56) References Cited

U.S. PATENT DOCUMENTS

| | | | | |
|---|---|---|---|---|
| 4,638,645 | A * | 1/1987 | Simila | F25D 3/08 62/371 |
| 4,938,375 | A * | 7/1990 | Fantacone | A47G 19/2211 210/464 |
| 4,941,590 | A * | 7/1990 | Pantaleo | A47G 19/2227 206/217 |
| 5,636,766 | A | 6/1997 | Delameter et al. | |
| 5,678,472 | A * | 10/1997 | Millman | A47G 19/14 99/279 |
| 5,746,113 | A * | 5/1998 | Ko | A47G 19/16 99/279 |
| 6,056,949 | A * | 5/2000 | Menzi | A23L 1/002 424/461 |
| 6,168,043 | B1 * | 1/2001 | Yen | A47G 23/0241 220/501 |
| 6,520,339 | B1 * | 2/2003 | Conway, Jr. | B65D 25/20 206/730 |
| 9,823,007 | B2 * | 11/2017 | Cheng | F25D 3/08 |
| 2003/0146241 | A1 | 8/2003 | Moothart et al. | |
| 2006/0213205 | A1 * | 9/2006 | Reverendo | A47J 36/2411 62/3.3 |
| 2008/0272146 | A1 | 11/2008 | Kaczmarek | |
| 2009/0053374 | A1 * | 2/2009 | Finn | A23L 2/56 426/425 |
| 2009/0056557 | A1 * | 3/2009 | Lin | A47J 31/02 99/323 |
| 2011/0300275 | A1 * | 12/2011 | Lackey | C02F 1/003 426/431 |
| 2013/0233890 | A1 * | 9/2013 | Melzer | C02F 1/003 222/189.06 |

OTHER PUBLICATIONS

International Search Report for International Application No. PCT/US2013/024527, filed Feb. 1, 2013, International Search Report dated Mar. 27, 2013 and mailed Apr. 15, 2013 (2 pgs.).

* cited by examiner

APPARATUS AND METHOD FOR HOLDING OBJECTS IN A CONTAINER

CROSS-REFERENCE TO RELATED APPLICATIONS

This application claims priority to and the benefit of U.S. Provisional Application No. 61/594,860, filed on. Feb. 3, 2012, U.S. Provisional Application No. 61/594,982, filed on Feb. 3, 2012, and U.S. Provisional Application. No. 61/624,210, flied on Apr. 13, 2012, in the United States Patent and Trademark Office, the entire content of each of which is incorporated herein by reference.

FIELD

Aspects of embodiments of the present invention relate to an apparatus and method for holding objects in a container.

BACKGROUND

It is common in the home and in commercial use to hold and dispense liquids in containers. Some of these containers have ice added to aid in the cooling of a beverage contained therein. It is also known that the flavor of a beverage may be enhanced by allowing items, such as fruits and vegetables to infuse with the liquids. Some containers contain an inner tube for containment of ice or other items. This allows for items to be contained within a cylinder inside the container containing a beverage. This container may be used for aesthetics or to add ice and cool the product.

Conventional jars and beverage containers have been used to hold liquid alcoholic and non-alcoholic beverages, with or without ice. Sometimes the liquids are alone and the jar is used simply to dispense the liquid. Some examples would be beverages served at picnics. Sometimes the conventional containers are used to create an aesthetically pleasing way to dispense and serve the liquid. These jars and containers have also been used to hold fruits, vegetables, and various other items to be infused into the liquid. However, in conventional infusion jars, objects added have been contained loosely in the container or sometimes housed in a separate container, and, therefore, are free to move around the container. They can float, sink, or block a spigot, and often do not provide a consistent aesthetic look and do not provide beneficial or consistent infusion of flavor into a beverage.

SUMMARY

According to an aspect of embodiments of the present invention, an apparatus and method of holding objects in a container provides an infusion jar in which objects, such as fruit or vegetables, are held (e.g., pressed or bruised) or constrained against an inner surface of a wall of a container, such as between an insert and the wall of the container. The container may be transparent such that the objects provide an aesthetically pleasing display, such as in a pattern of a design or logo (e.g., a logo representative of a hotel or convention).

According to another aspect of embodiments of the present invention, an apparatus and method of holding objects in a container (e.g., fruit or vegetables in an infusion jar) provides uniformity of design and exacting taste because of a framework of the apparatus which provides more exacting standards. Embodiments of the present invention may be used in a home, hotel or resort, convention center, restaurant or bar, or at a liquor company, for example.

According to aspects of embodiments of the present invention, an apparatus and method for holding objects in a container provides a consistent appearance, taste, and recipe, while saving time, effort, and energy of assembling the containers (e.g., infusion jars), and also facilitates creation of a patterned design or logo that may withstand gravitational forces and movement of ice or liquid in the container. According to another aspect of embodiments of the present invention, objects held in the container may be thinner and smaller, thereby reducing cost, and may be aesthetically held on the holding apparatus, or between an insert and an inner surface of an outer wall of a container, such that the objects appear to be floating or weightless in the container. Embodiments of the present invention reduce time in building a display, save materials and cost, and allow for freedom and creativity to quickly and easily display a design or logo. Because of a predetermined framework, consistency of design is obtained. Embodiments of the present invention allow for holding items on the apparatus outside of the container, thereby allowing for an easier working environment. Further, embodiments of the present invention reduce the training needed to assemble and implement the design or logo, such as training required of a hotel employee. Further, a design or logo may be held in place longer. According to another aspect of embodiments of the present invention, a more precise and exacting recipe allowing for potential nutrient claims and standardized formulation of both product and design may be obtained and repeatable. Further, attaching the object to the holding device by puncturing, clasping, or impalement aids in extracting and/or bruising of certain items, thereby improving the taste, recipe, and design nutrients of the product. Also, the amount and size, in particular thickness, of the items inside the container may be reduced.

According to one embodiment of the present invention, a container includes: an outer wall defining a cavity and having an opening to an outside of the container; and a holding device in the cavity and including a wall spaced apart from the outer wall and defining a gap therebetween for holding an object between the wall and the outer wall.

The holding device may be removably receivable in the cavity through the opening.

The holding device may include an acrylic tube, or may be fabricated from acrylic or an extruded acrylic.

In one embodiment, the container is configured to contain a fluid in the cavity, the outer wall includes a sealable spigot that is openable to release the fluid from the cavity, and the holding device has an opening through the wall adjacent the spigot.

In one embodiment, the container is configured to contain a fluid in the cavity, and the holding device has at least one opening through the wall such that a region of the cavity inside the wall is in fluidic communication with another region of the cavity defined between the wall and the outer wall.

The outer wall may be substantially transparent.

The holding device may be configured to hold the object adjacent the outer wall.

According to another embodiment of the present invention, a container includes: an outer wall defining a cavity and having an opening to an outside of the container; and a holding device in the cavity and including a wall spaced apart from the outer wall and defining a gap therebetween; and an object held in the gap between the wall and the outer wall.

In one embodiment, the container is configured to contain a fluid in the cavity, the outer wall includes a sealable spigot that is openable to release the fluid from the cavity, and the holding device has an opening through the wall adjacent the spigot.

In one embodiment, the container is configured to contain a fluid in the cavity, and the holding device has at least one opening through the wall such that a region of the cavity inside the wall is in fluidic communication with another region of the cavity defined between the wall and the outer wall.

The outer wall may be substantially transparent.

The object may include a plurality of objects stacked on one another and held adjacent the outer wall.

The object may include at least one of a fruit or a vegetable.

According to another embodiment of the present invention, a method of holding an object in a container, the container including an outer wall defining a cavity of the container and having an opening to an outside of the container, includes: providing a holding device in the cavity, the holding device including a wall spaced apart from the outer wall and defining a gap therebetween; and inserting the object in the gap between the wall and the outer wall.

The method may further include holding the object adjacent the outer wall of the container.

The method may further include pressing the object against the outer wall of the container.

The method may further include containing a beverage in the cavity, the object including at least one of a fruit or a vegetable.

In one embodiment, inserting the object in the gap includes stacking a plurality of objects in the gap, and the container is substantially transparent, and objects of the plurality of objects are visible from the outside of the container around a periphery thereof.

According to another embodiment of the present invention, an apparatus for holding objects in a container includes a base portion, and a plurality of protrusions extending from the base portion and configured to support the objects thereon, and the apparatus is removably receivable in a cavity of the container to hold the objects in the cavity.

The protrusions may each be configured to impale one of the objects.

In one embodiment, the base portion includes a plurality of support members spaced apart from one another and extending in a first direction, and at least one connection member connecting the plurality of support members, and protrusions of the plurality of protrusions are spaced apart from one another in the first direction on each of the support members. The protrusions may extend outward from the support members at an angle toward the first direction.

In one embodiment, the base portion includes a plurality of rings spaced apart from one another in a first direction, and at least one connection member connecting the plurality of rings, and protrusions of the plurality of protrusions are spaced apart from one another around each of the rings and extend outward from the rings at an angle toward the first direction.

In one embodiment, the base portion has a substantially spiral shape, and the protrusions are spaced apart from one another along a length of the base portion.

According to another embodiment of the present invention, a container includes an outer wall defining a cavity and having an opening between the cavity and an outside of the outer wall; and a holding device removably receivable in the cavity through the opening and configured to hold an object in the cavity.

The holding device may include a protrusion configured to support the object. The protrusion may include a plurality of protrusions spaced apart from one another around a periphery of the holding device.

In one embodiment, the container is configured to contain a fluid in the cavity, the outer wall includes a sealable spigot that is openable to release the fluid from the cavity, and the holding device comprises a screen adjacent the spigot.

The outer wall is substantially transparent. The holding device may be configured to hold the object adjacent the outer wall.

According to another embodiment of the present invention, a method of holding objects in a container, the container defining a cavity therein and having an opening between the cavity and an outside of the container, includes holding an object on a holding device, and inserting the holding device through the opening and into the cavity.

In one embodiment, holding the object on the holding device includes supporting the object on a protrusion of the holding device. Holding the object on the holding device may further include impaling the object on the protrusion.

The method may further include inserting a funnel in the opening of the container, and guiding the holding device through the opening using the funnel.

The method may further include holding the object adjacent an outer wall of the container. In one embodiment, the method further includes pressing the object against an outer wall of the container.

In one embodiment, the method further includes containing a beverage in the cavity, and the object is a fruit or a vegetable.

In one embodiment, holding the object on the holding device includes holding a plurality of objects on the holding device, the container is substantially transparent, and objects of the plurality of objects are visible from outside the container around a periphery thereof when the holding device is inserted in the cavity.

According to an aspect of embodiments of the present invention, an insert is configured to hold and/or display objects, such as fruit, vegetables, decorative items, or any other objects to aesthetically alter the visual appearance of any container. According to an aspect of embodiments of the present invention, objects may be inserted and held between an insert that is within a container and an outer wall of the container. The insert may be a tubular insert having a circular or square cross-sectional shape, for example, and may be made of a transparent material, such as a transparent plastic material. According to an aspect of embodiments of the present invention, objects may be attached to or held on an insert, or holding device or apparatus, by impalement, clasp, hook, clip, spring, cup, projection, protrusion, or other suitable device, and made into decorative designs, for example, while the insert may be placed into a container, such as a container having a transparent outer wall for displaying the held objects. The insert may include a handle for facilitating insertion into and removal from the container. According to another aspect of embodiments of the present invention, the holding device may be inserted together with or independent from a pressure member which may provide additional pressure on the objects against an outer wall of the container, for example, and may further include a cradle, clasp, or impaling point to hold objects in place when inserted into any container. According to another aspect of embodiments of the present invention, a funnel may be used to guide the holding device and objects into the container.

Other features and advantages of embodiments of the present invention will become apparent from the following detailed description, taken in conjunction with the accompanying drawings which illustrate, by way of example, features and aspects of exemplary embodiments of the present invention.

BRIEF DESCRIPTION OF THE DRAWINGS

The above and other features, aspects, and advantages of the present invention will become better understood with regard to the following description, appended claims, and accompanying drawings where:

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive.

Figure 1:
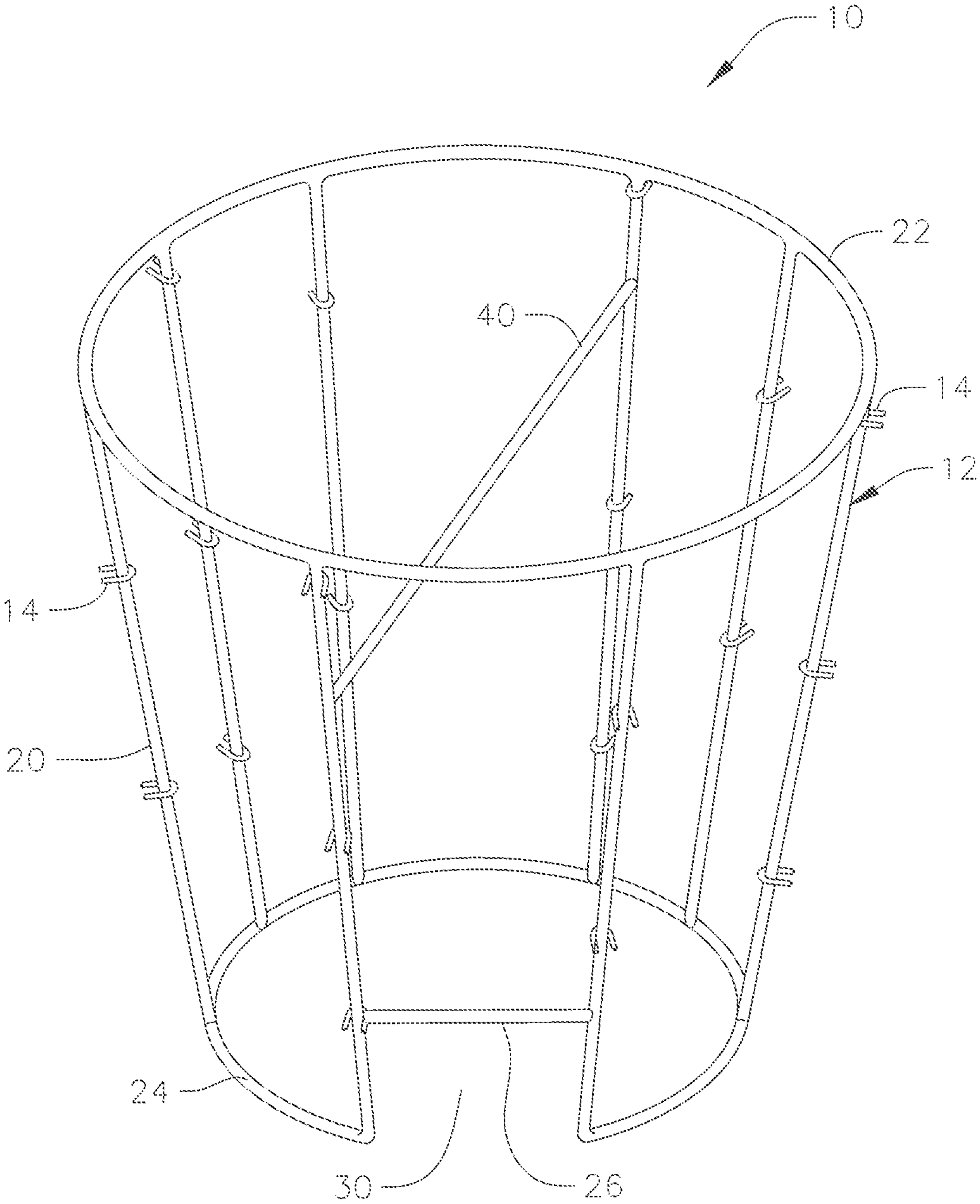
FIG. 1 is a perspective view of an apparatus for holding objects in a container according to an exemplary embodiment of the present invention.
Figure 2:
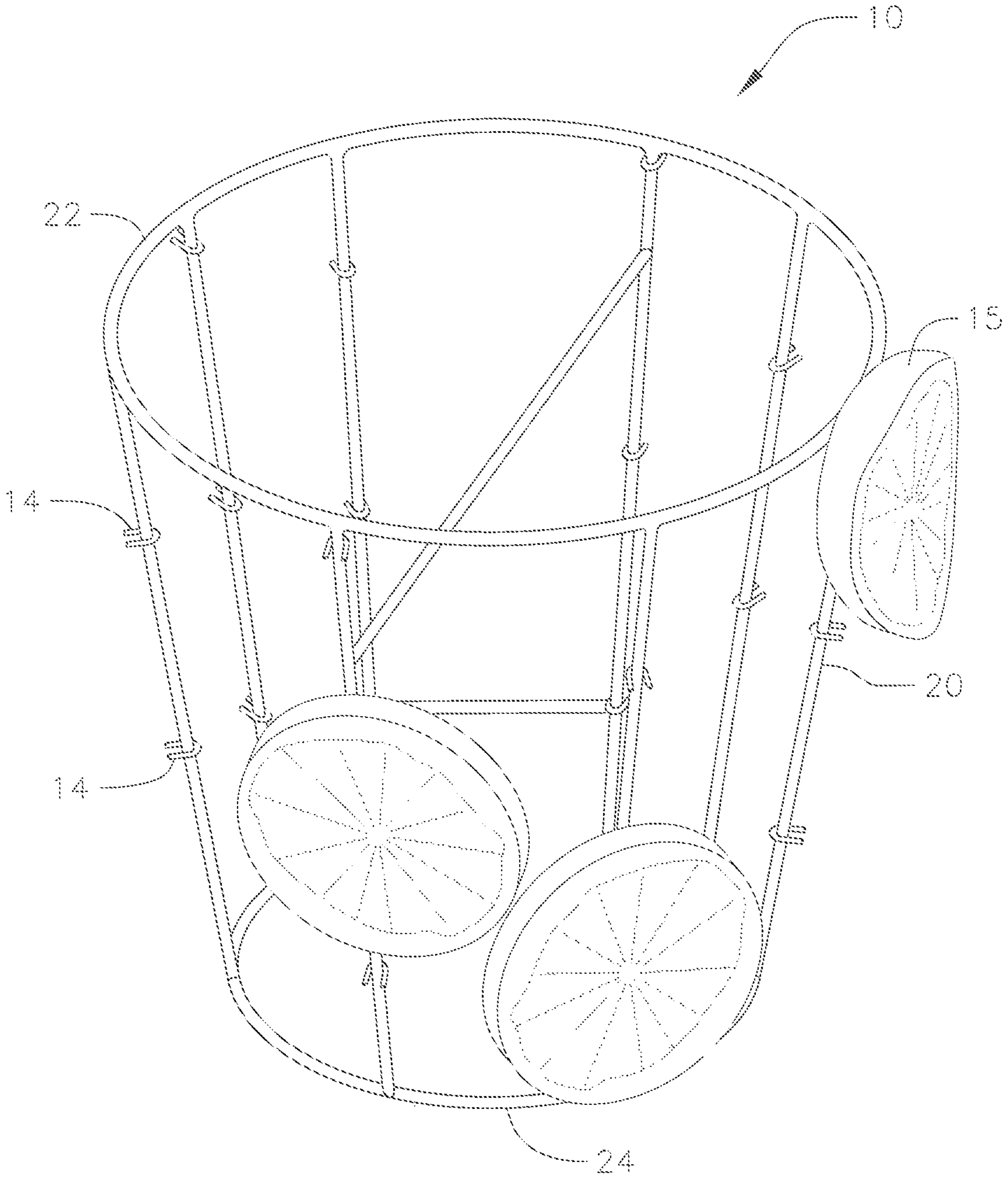
FIG. 2 is a perspective view of the apparatus of FIG. 1 shown holding objects.

With reference to FIGS. 1 and 2, an apparatus 10 for holding objects in a container according to one exemplary embodiment of the present invention includes a frame 12, or base portion, and one or more protrusions 14 attached to the frame 12. The frame 12 provides a support structure for holding and supporting one or more objects 15, and the protrusions 14 are configured to hold the objects 15. The objects 15, in one embodiment, may be fruit or vegetables (e.g., slices of fruit or vegetables), but are not limited thereto. The apparatus 10 may be made of stainless steel, aluminum, fiberglass, ceramic, a plastic, or any other suitable material.

In one embodiment, as shown in FIGS. 1 and 2, each of the protrusions 14 generally has a U-shape with two prongs configured to support the object 15, such as by impaling the object 15 thereon. However, the present invention is not limited to the U-shaped protrusions, and the protrusions 14 according to other embodiments may have any other suitable shape for impaling, supporting, or otherwise holding the object 15. For example, the protrusions 14 may include hooks, cups, clips, wires, springs, coils, pegs, cradles, clasps, impalements, projections, or any suitable variations or combinations thereof. Further, in another embodiment, the apparatus may have a holding device or mechanism (e.g., a slot or groove) that is not a protrusion.

The protrusions 14 may be integrally formed with the frame 12 or may be attached to the frame 12 by welding, fasteners, or any other suitable attachment device or method. Further, the protrusions 14 may be spaced apart from one another on the frame in a regular or irregular pattern, or may be spaced to produce a pattern, such as a decorative pattern, a letter, or a logo, when the objects 15 are supported thereon.

The frame 12, in one embodiment, includes a plurality of supports 20 (e.g., vertical supports) and one or more connecting members 22, 24 connecting the supports 20. In one embodiment, the frame 12 includes an upper connecting member 22 that is configured as a ring, and a lower connecting member 24 that is configured as a portion of a ring having an opening 30. As described later herein, the opening 30 may accommodate a spigot of a container. In one embodiment, the apparatus 10 may include a screen adjacent the opening 30. Further, in one embodiment, the frame 12 may include a connecting part 26 above the opening 30. In one embodiment, the apparatus 10 may further include a handle 40 for lifting the apparatus 10, such as into and out from a container. The handle 40, in one embodiment, may be a horizontal member connected between two of the supports 20. The protrusions 14, in one embodiment, are spaced apart on and attached to the supports 20. However, in other embodiments, the protrusions 14 may be attached to one or more of the connecting members 22, 24 or to both the supports 20 and one or more of the connecting members 22, 24.

Figure 3:
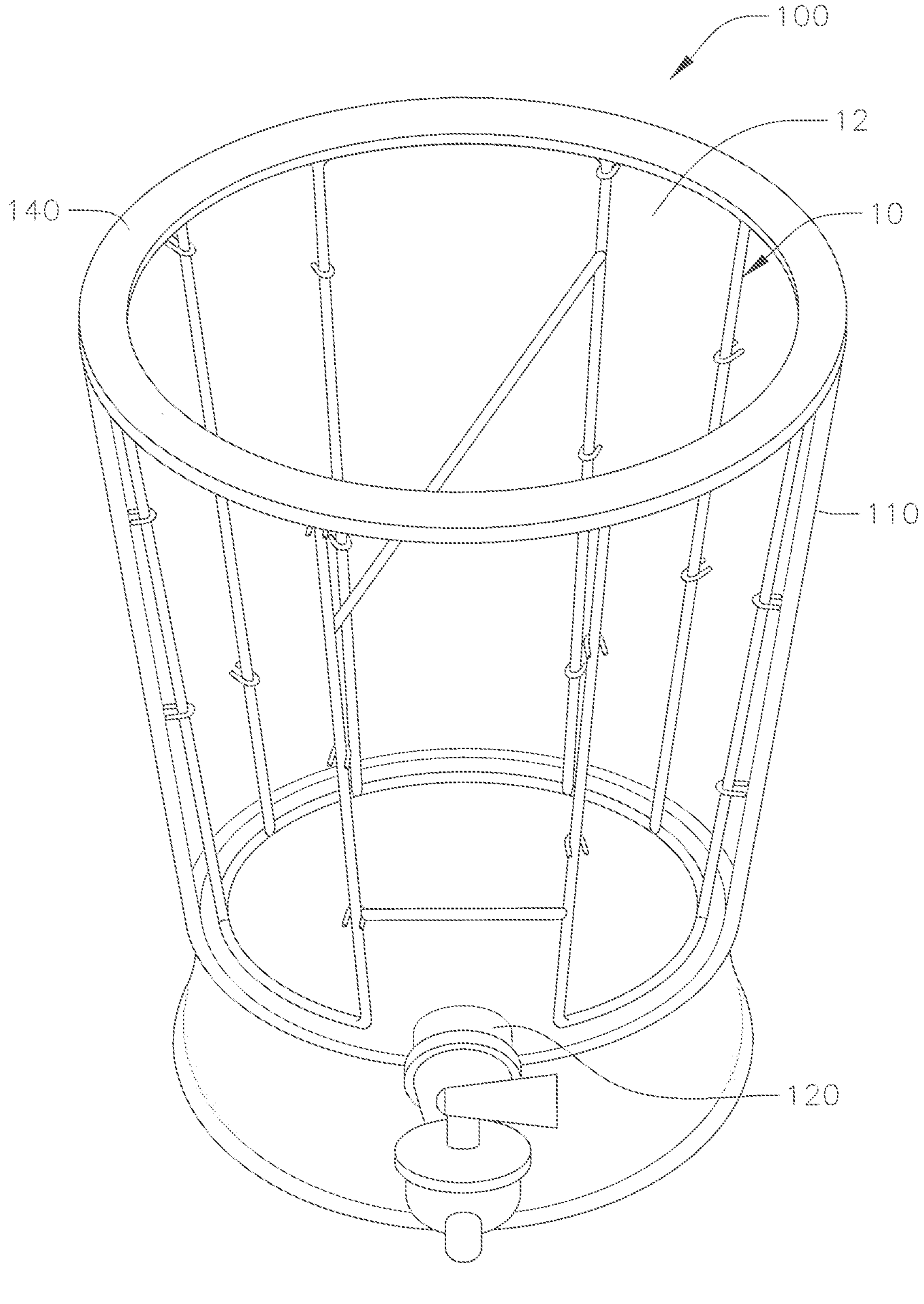
FIG. 3 is a perspective view of a container according to an exemplary embodiment of the present invention, the container including the apparatus of FIG. 1.
Figure 4:
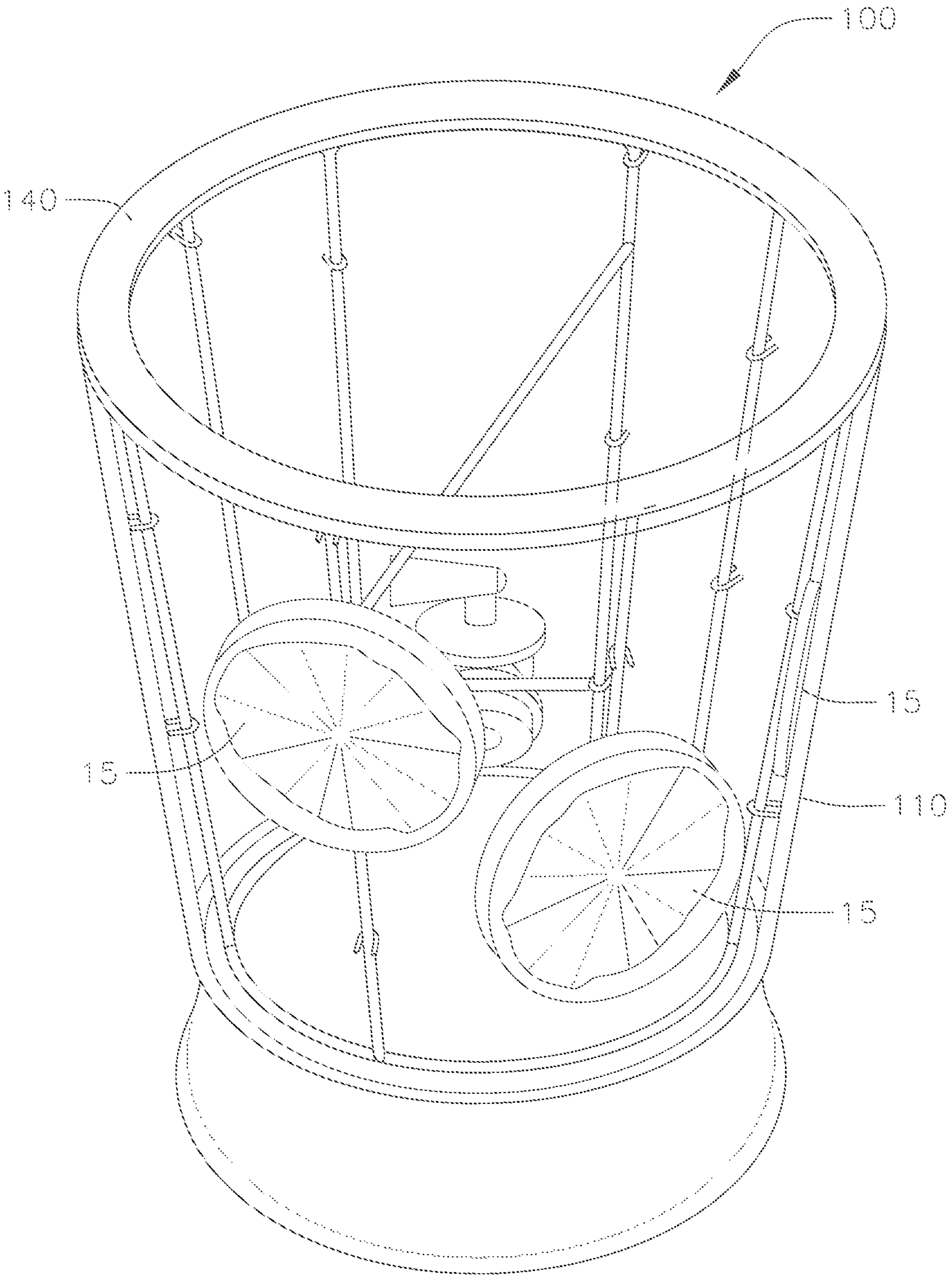
FIG. 4 is a perspective view of the container of FIG. 3, the container including the apparatus of FIG. 1 shown holding objects.
Figure 5:
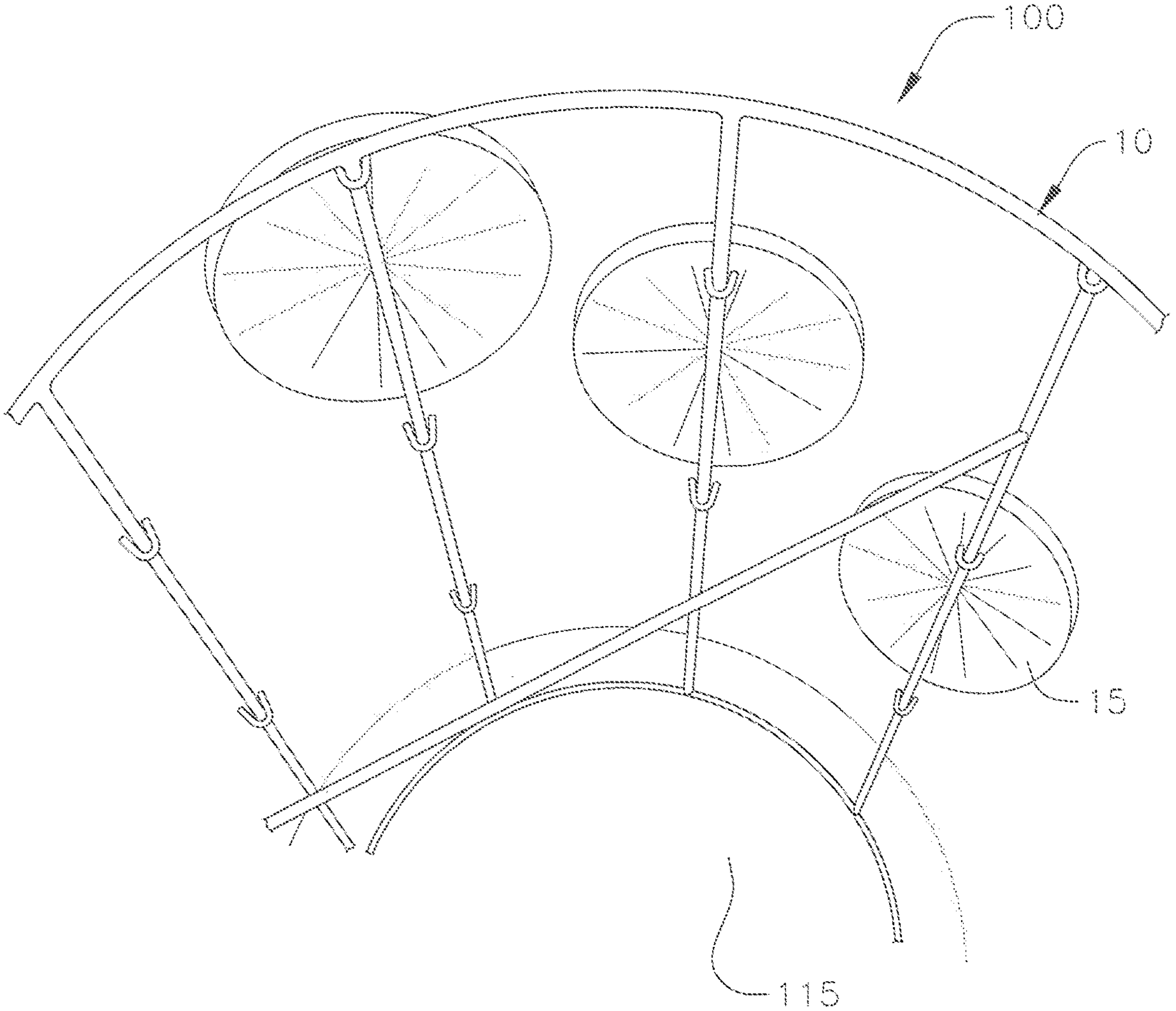
FIG. 5 is a partial top perspective view of the container of FIG. 3, the container including the apparatus of FIG. 1 shown holding objects.

With reference to FIGS. 3-5, a container 100 according to an exemplary embodiment of the present invention includes the apparatus 10 described above and shown in FIGS. 1 and 2. In one embodiment, the container 100 includes an outer wall 110 defining a cavity 115. The outer wall 110, in one embodiment, is transparent or substantially transparent. The apparatus 10 is configured to be inserted through an opening 112 of the container 100 and into the cavity 115 and, in one embodiment, may be inserted into the cavity 115 of the container 100 via a funnel 140. In one embodiment, when the apparatus 10 is in the cavity 115, the objects 15 held on the apparatus 10 are adjacent or pressed against an inner surface of the outer wall 110. In one embodiment, the container 100 is configured to contain a fluid (e.g., a beverage) in the cavity 115 and, in one embodiment, further includes a sealable spigot 120 for releasing the fluid out of the cavity 115.

Figure 6:
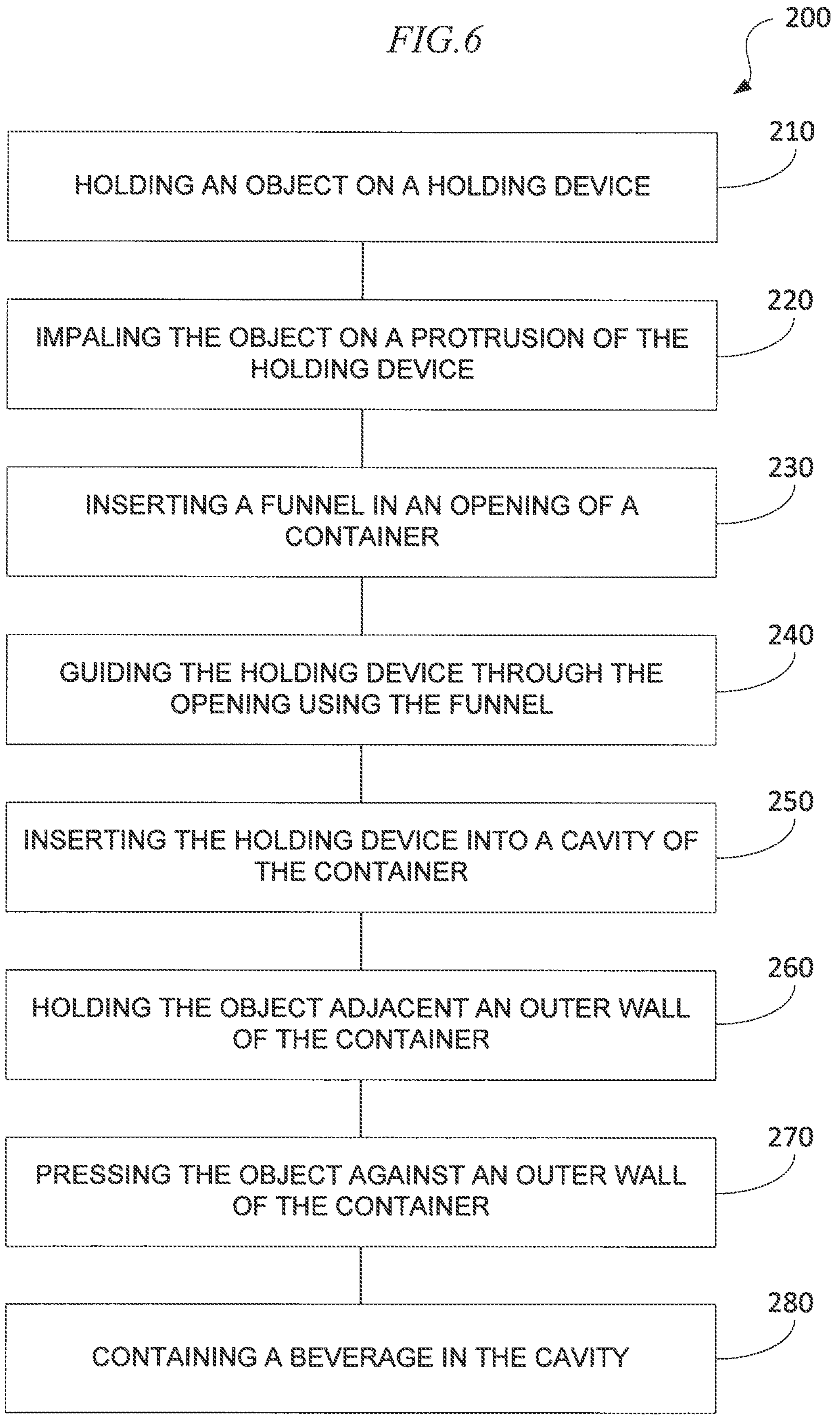
FIG. 6 is a flowchart showing tasks of a method of holding objects in a container according to an embodiment of the present invention.

With reference to FIG. 6, a method 200 of holding objects in a container is shown. While the method 200 is described herein with respect to the apparatus 10 and the container 100 described above and shown in FIGS. 1 through 5, the method 200, or at least some of the tasks thereof, may be performed using an apparatus and/or a container according to other embodiments of the present invention, such as the apparatus and container shown in FIGS. 7-9 or one of the apparatuses shown in FIGS. 10-12, for example.

In one embodiment, the method 200 includes a task 210 of holding the object 15 on a holding device (e.g., the apparatus 10). The object 15 may be a fruit (e.g., a slice of a fruit) or a vegetable (e.g., a slice of a vegetable), for example. The task 210 may include supporting the object 15 on the protrusion 14 of the apparatus 10. Further, in one embodiment, the method 200 includes a task 220 of impaling the object 15 on the protrusion 14. The task 210 may include holding a plurality of the objects 15 on the apparatus 10.

The method 200, in one embodiment, includes a task 230 of inserting the funnel 140 in the opening 112 of the container 100. The method 200, in one embodiment, further includes a task 240 of guiding the holding device (e.g., the apparatus 10) through the opening 112 using the funnel 140.

The method 200, in one embodiment, further includes a task 250 of inserting the holding device (e.g., the apparatus 10) through the opening 112 and into the cavity 115. For example, a user may hold the handle 140 to lower the apparatus 10 into the cavity 115 or remove the apparatus 10 from the cavity 115.

The method 200, in one embodiment, includes a task 260 of holding the object 15 adjacent the outer wall 110 of the container 100. In one embodiment, the outer wall 110 of the container 100 is transparent or substantially transparent, and the object 15 is visible from outside the container 100 when the apparatus 10 is inserted in the cavity 115. In one embodiment, a plurality of the objects 15 is visible from outside the container 100 around a periphery thereof.

The method 200, in one embodiment, includes a task 270 of pressing the object 15 against the outer wall 110 of the container 100. For example, in one embodiment, a spring may be used to press the object 15 against the outer wall 110. In another embodiment, for example, the apparatus 10 and/or the object 15 may be sized such that a distance between opposite outermost sides (e.g., a diameter) of the apparatus 10 having the object 15 supported thereon is slightly less than a distance between inner surfaces of opposite outer walls 110 (e.g., a diameter) of the container 100.

The method 200, in one embodiment, includes a task 280 of containing a fluid (e.g., a beverage) in the cavity 115 of the container 100. The fluid may be poured into the cavity 115 before or after the apparatus 10 is inserted into the cavity 115. Also, in one embodiment, the fluid is releasable from the cavity 115 via the spigot 120 and may also be refilled.

While in one embodiment, the method 200 of holding objects in a container may include each of the tasks described above and shown in FIG. 6, in other embodiments of the present invention, in a method of holding objects in a container, one or more of the tasks described above and shown in FIG. 6 may be absent and/or additional tasks may be performed. Further, in the method 200 of holding objects in a container according to one embodiment, the tasks may be performed in the order depicted in FIG. 6. However, the present invention is not limited thereto and, in a method of holding objects in a container according to other embodiments of the present invention, the tasks described above and shown in FIG. 6 may be performed in any other suitable sequence.

Figure 7:
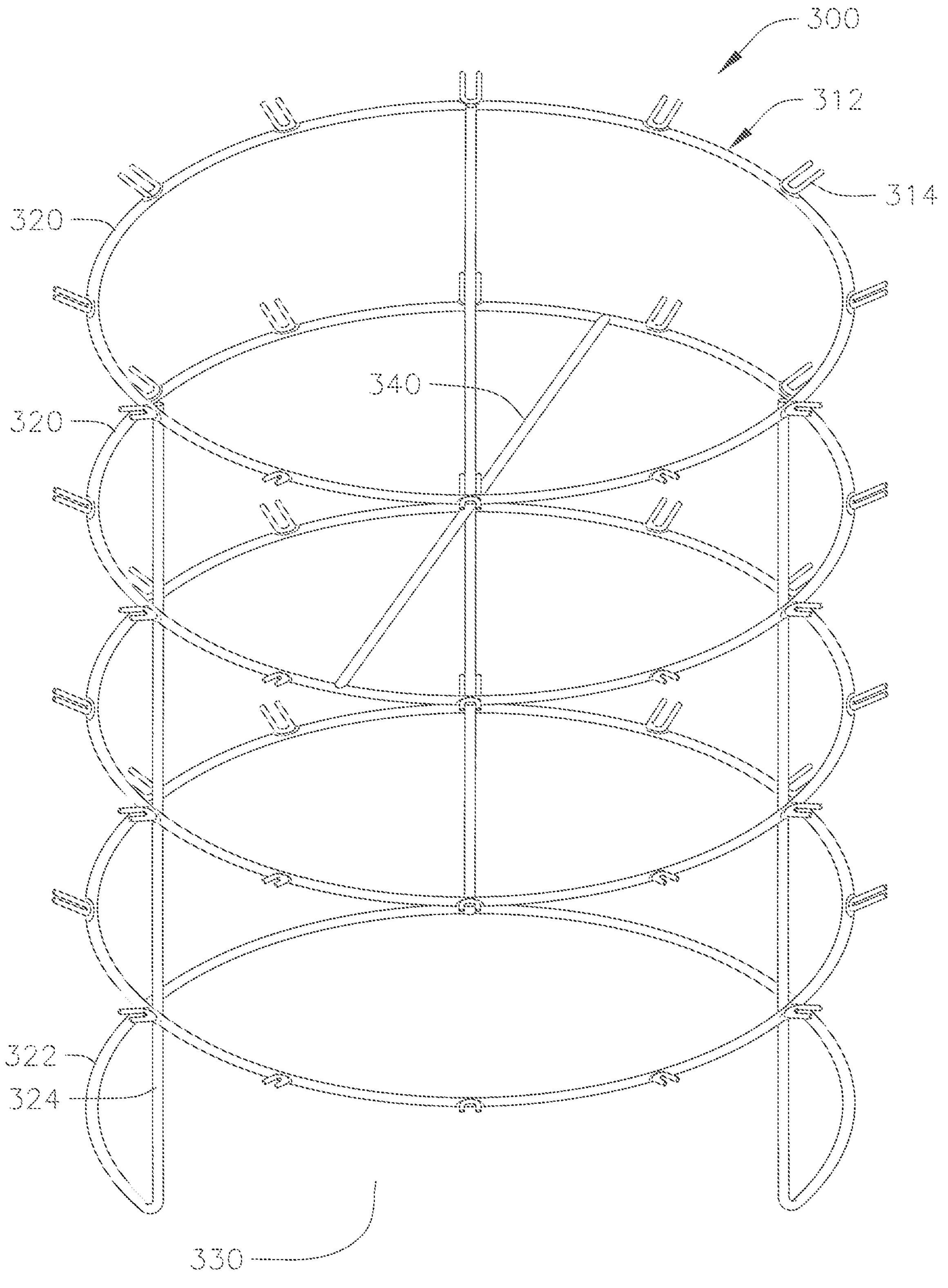
FIG. 7 is a perspective view of an apparatus for holding objects in a container according to another exemplary embodiment of the present invention.
Figure 8:
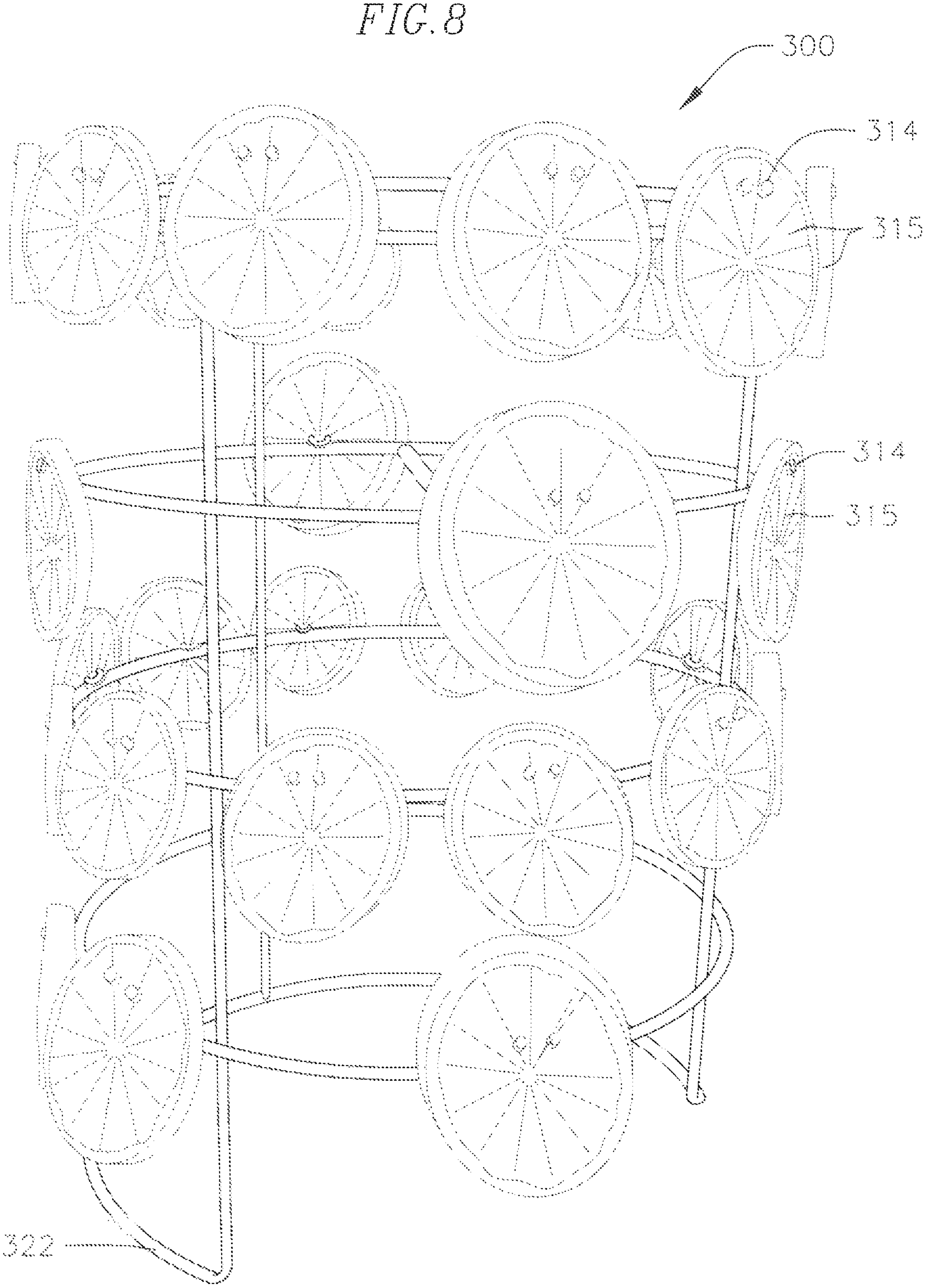
FIG. 8 is a perspective view of the apparatus of FIG. 7, shown holding objects.

With reference to FIGS. 7 and 8, an apparatus 300 for holding objects in a container according to another exemplary embodiment of the present invention includes a frame 312, or base portion, and one or more protrusions 314 attached to the frame 312. The frame 312 provides a support structure for holding and supporting one or more objects 315, and the protrusions 314 are configured to hold the objects 315. The objects 315, in one embodiment, may be fruit or vegetables (e.g., slices of fruit or vegetables), but are not limited thereto. The apparatus 300 may be made of stainless steel, aluminum, fiberglass, ceramic, a plastic, or any other suitable material. The protrusions 314 may have a same or similar configuration and may be attached to the frame 312 in a same or similar manner as the protrusions 14 described above with respect to the frame 12.

The frame 312, in one embodiment, includes a plurality of rings 320 (e.g., horizontal rings) and one or more connectors 324 connecting the rings 320. In one embodiment, the frame 312 includes a plurality of the rings 320 spaced apart from one another in a vertical direction, and a lower ring 322 that is configured as a portion of a ring having an opening 330. The opening 330 may accommodate a spigot of a container. In one embodiment, the apparatus 300 may include a screen adjacent the opening 330. In one embodiment, the apparatus 300 may further include a handle 340 for lifting the apparatus 300, such as into and out from a container. The handle 340, in one embodiment, may be a horizontal member connected between two of the rings 320. The protrusions 314, in one embodiment, are spaced apart on and attached to the rings 320. However, in other embodiments, the protrusions 314 may be attached to the connectors 324 or to both the rings 320 and the connectors 324.

Figure 9:
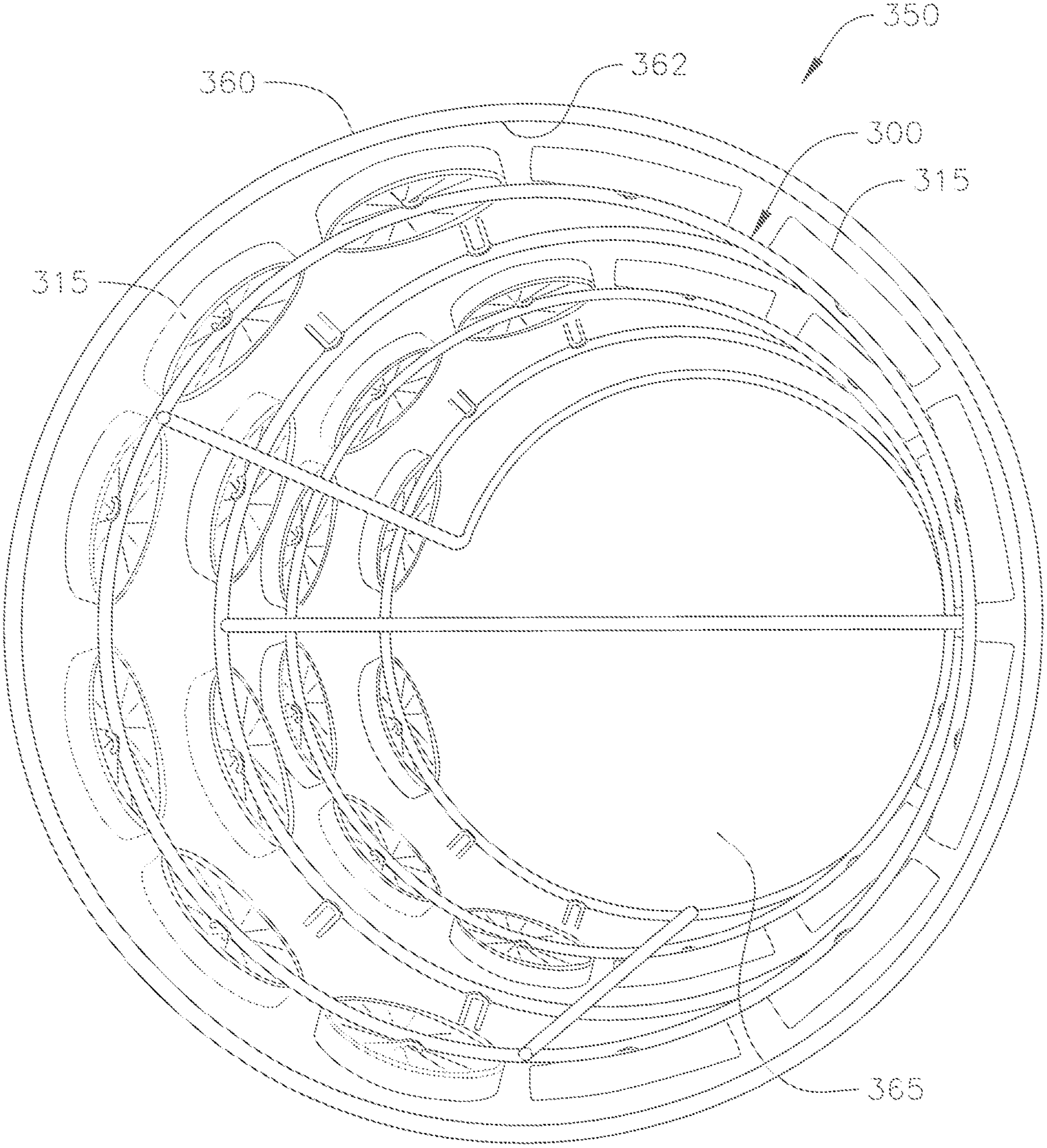
FIG. 9 is a top perspective view of a container according to another exemplary embodiment of the present invention, the container including the apparatus of FIG. 7 shown holding objects.

With reference to FIG. 9, a container 350 according to another exemplary embodiment of the present invention includes the apparatus 300 described above and shown in FIGS. 7 and 8. The container 350 may be the same or substantially similar to the container 100 described above. In one embodiment, the container 350 includes an outer wall 360 defining a cavity 365. The outer wall 360, in one embodiment, is transparent or substantially transparent. The apparatus 300 is configured to be inserted through an opening of the container 350 and into the cavity 365 and, in one embodiment, may be inserted into the cavity 365 of the container 350 via a funnel, such as described above with respect to the funnel 140. In one embodiment, when the apparatus 300 is in the cavity 365, the objects 315 held on the apparatus 300 are adjacent or pressed against an inner surface 362 of the outer wall 360.

Figure 10:
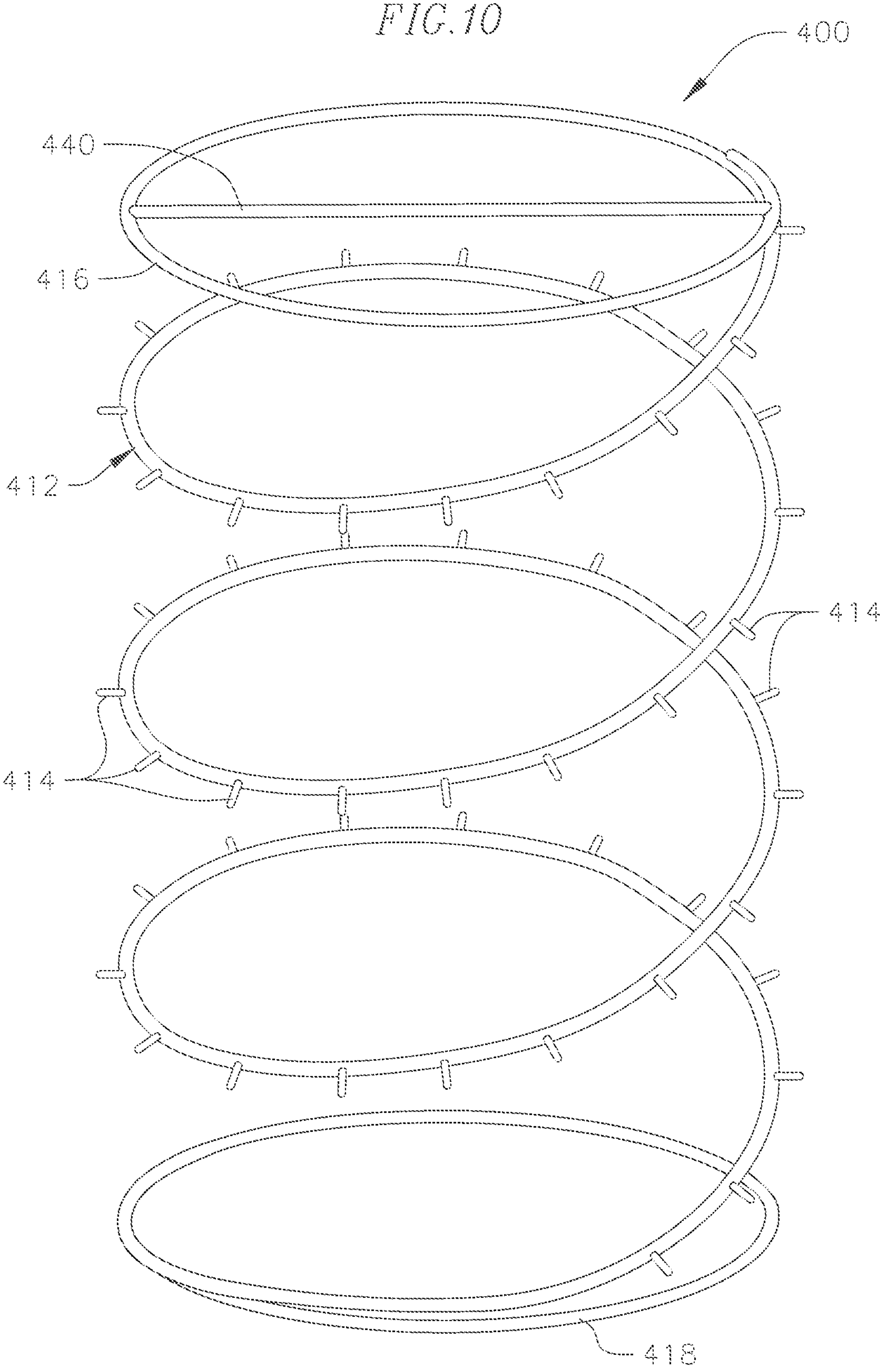
FIG. 10 is a schematic view of an apparatus for holding objects in a container according to another embodiment of the present invention.
Figure 11:
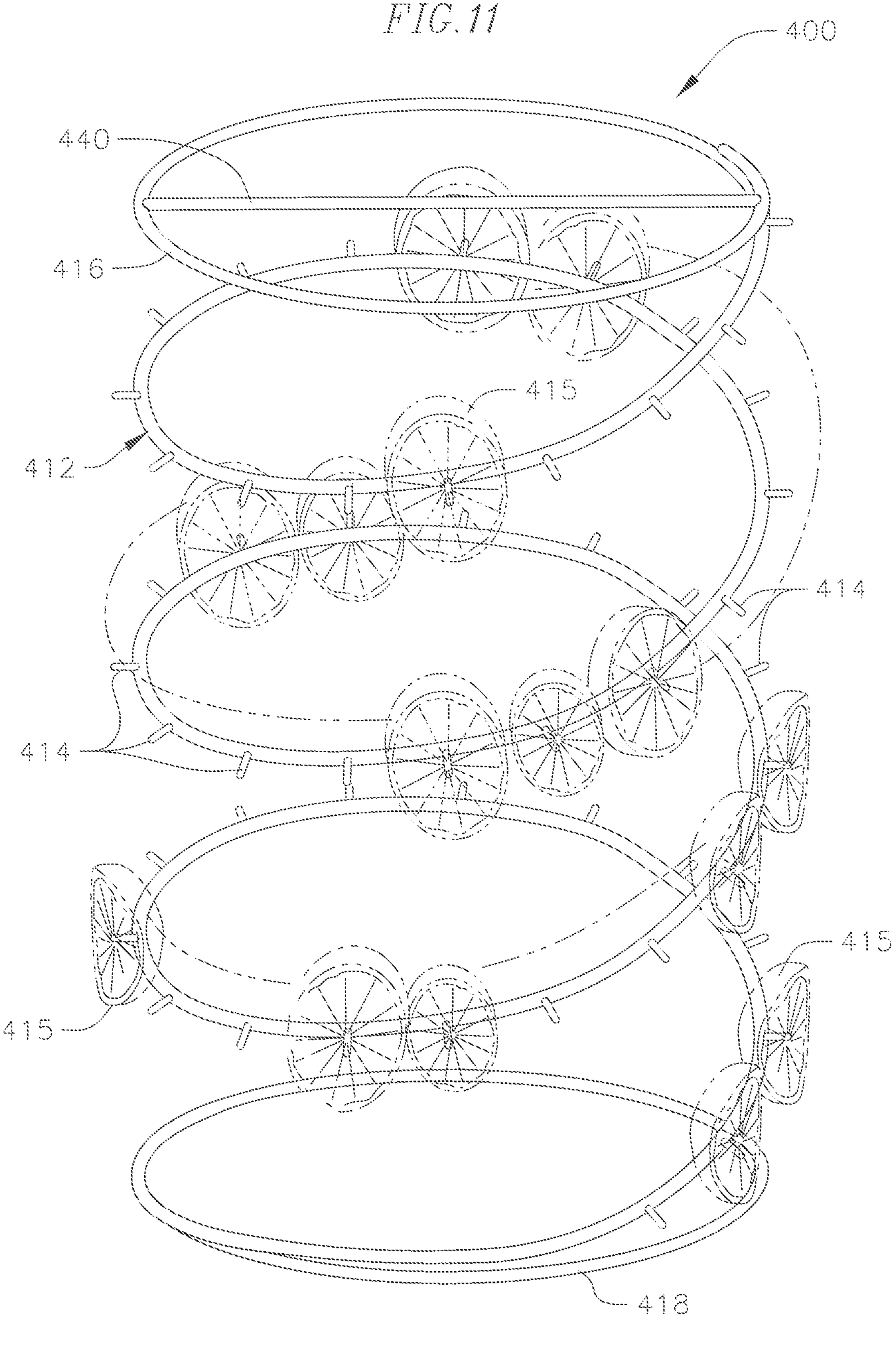
FIG. 11 is a schematic view of the apparatus of FIG. 10, shown holding objects.

With reference to FIGS. 10 and 11, an apparatus 400 for holding objects in a container according to another exemplary embodiment of the present invention includes a frame 412, or base portion, and one or more protrusions 414 attached to the frame 412. The frame 412 provides a support structure for holding and supporting one or more objects 415, and the protrusions 414 are configured to hold the objects 415. The objects 415, in one embodiment, may be fruit or vegetables (e.g., slices of fruit or vegetables), but are not limited thereto. The apparatus 400 may be made of stainless steel, aluminum, a plastic, or any other suitable material. The protrusions 414 may have a same or similar configuration and may be attached to the frame 412 in a same or similar manner as the protrusions 14 described above with respect to the frame 12.

The frame 412, in one embodiment, includes an upper ring portion 416, a lower ring portion 418 and a spiral portion between the upper ring portion 416 and the lower ring portion 418. In one embodiment, the upper ring portion 416, the spiral portion, and the lower ring portion 418 may be integrally formed, such as from a single formed wire. In one embodiment, the apparatus 400 may further include a handle 440 for lining the apparatus 400, such as into and out from a container. The handle 340, in one embodiment, may be a horizontal member connected between opposite sides of the upper ring portion 416. The protrusions 414, in one embodiment, are spaced apart on the spiral portion. In one embodiment, the spiral portion may have a larger diameter proximate the upper ring portion 416 than proximate the lower ring portion 418.

Figure 12A:
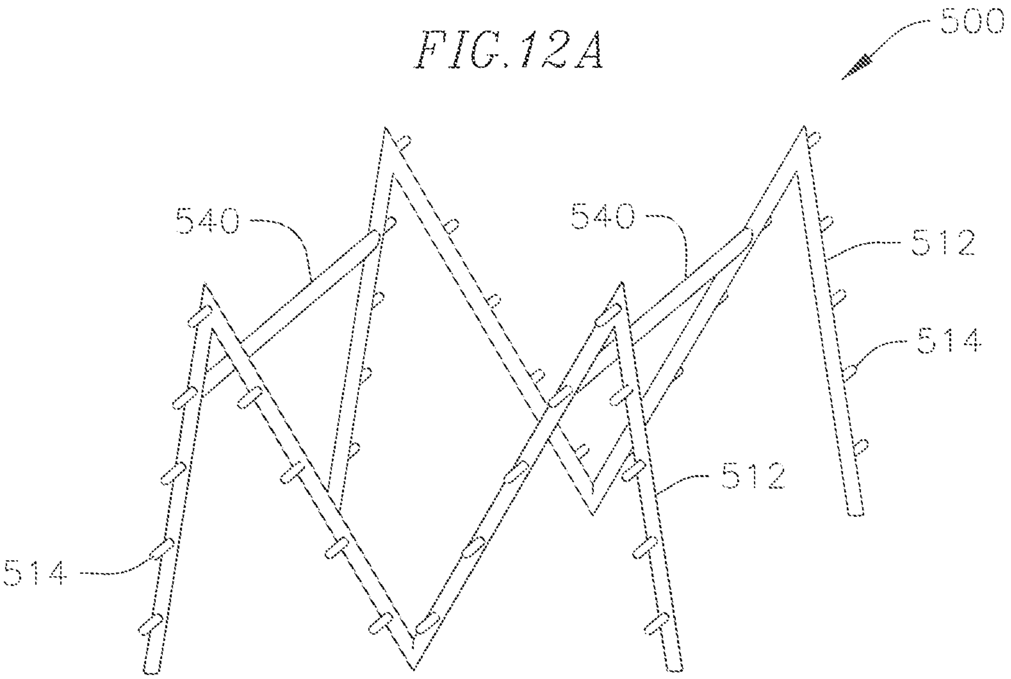
FIG. 12A is a schematic view of an apparatus for holding objects in a container according to another embodiment of the present invention.
Figure 12B:
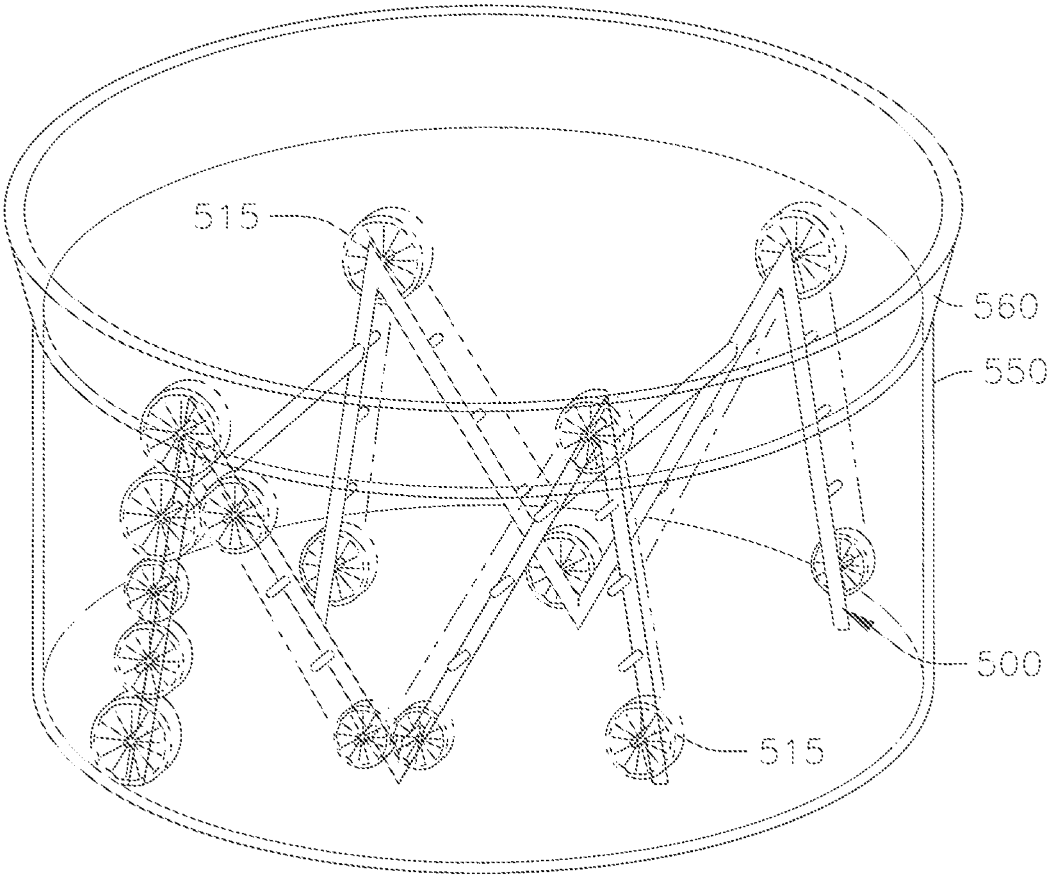
FIG. 12B is a schematic view of a container including the apparatus of FIG. 12A, shown holding objects.

With reference to FIG. 12, an apparatus 500 for holding objects in a container according to another exemplary embodiment of the present invention includes a frame 512, or base portion, and one or more protrusions 514 attached to the frame 512. The frame 512 provides a support structure for holding and supporting one or more objects 515, and the protrusions 514 are configured to hold the objects 515. The objects 515, in one embodiment, may be fruit or vegetables (e.g., slices of fruit or vegetables), but are not limited thereto. The apparatus 500 may be made of stainless steel, aluminum, a plastic, or any other suitable material. The protrusions 514 may have a same or similar configuration and may be attached to the frame 512 in a same or similar manner as the protrusions 14 described above with respect to the frame 12.

The frame 512, in one embodiment, is configured to have one or more patterns, such as a letter "M" as shown. In one embodiment, the apparatus 500 may further include a handle 540 for lifting the apparatus 500, such as into and out from a container. The handle 540, in one embodiment, may be a horizontal member connected between two opposing "M"-shaped portions of the frame 512. The protrusions 514, in one embodiment, are spaced apart on the "M"-shaped portion. The apparatus 500 is configured to be inserted into a cavity of a container 550 and, in one embodiment, may be inserted into a cavity of the container 550 using a funnel 560.

Figure 13:
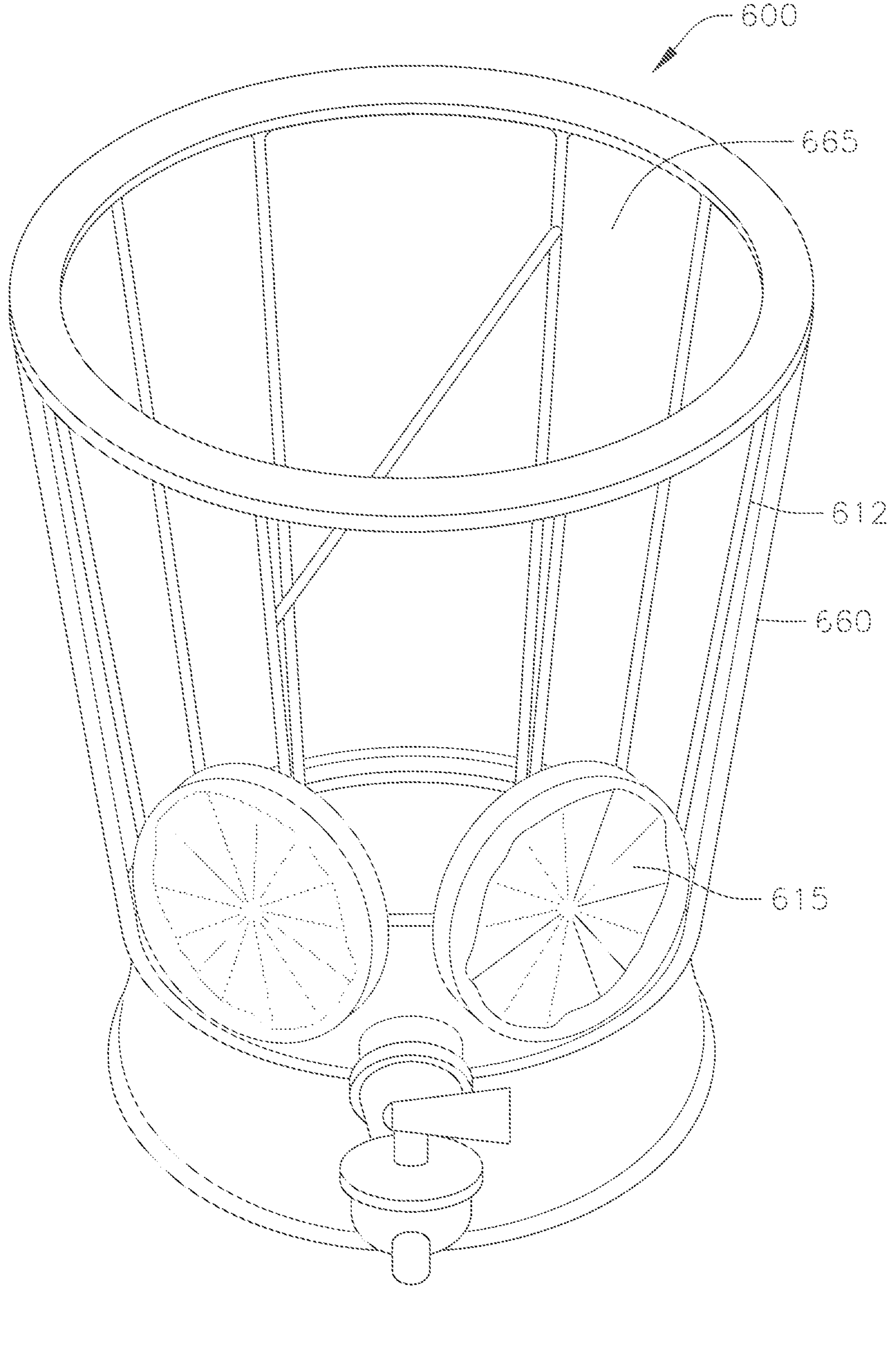
FIG. 13 is a perspective view of a container according to another exemplary embodiment of the present invention.

With reference to FIG. 13, a container 600 according to another exemplary embodiment of the present invention includes an apparatus 612 for holding one or more objects 615 in the container 600. The container 600 may be the same or substantially similar to the container 100 described above. In one embodiment, the container 600 includes an outer wall 660 defining a cavity 665. The outer wall 660, in one embodiment, is transparent or substantially transparent. The apparatus 612 according to one embodiment includes a frame which provides a support structure for holding and supporting one or more objects 615 between the apparatus 612 and the outer wall 660 of the container 600. That is, the objects 615 may be dropped into the cavity 665 between the apparatus 612 and the outer wall 660. In one embodiment, a width of a gap between the apparatus 612 and the outer wall 660 may be substantially the same as a thickness of the object 615 such that the object 615 has a substantially snug fit between the apparatus 612 and the outer wall 660. In other embodiments, however, the object 615 may have a looser fit between the apparatus 612 and the outer wall 660 or, alternatively, may be pressed against the outer wall 660 by the apparatus 612. The objects 615, in one embodiment, may be fruit or vegetables (e.g., slices of fruit or vegetables), but are not limited thereto. The apparatus 612 may be made of stainless steel, aluminum, a plastic, or any other suitable material.

While the apparatus 612, in one embodiment, may be substantially the same as the apparatus 10 described above and shown in FIGS. 1 and 2, except that the apparatus 612 does not have the protrusions 14 of the apparatus 10, embodiments of the present invention are not limited thereto. For example, in another embodiment, an apparatus for holding objects in a container may be substantially the same as the apparatus 300 described above and shown in FIGS. 7 and 8, except without the protrusions 314. Alternatively, an apparatus for holding objects in a container according to the present invention may have any other suitable configuration (e.g., a sheet of a plastic material rolled in a substantially tubular shape) for holding objects between the apparatus and a wall of a container. According to another embodiment of the present invention, an apparatus for holding the objects 615 in the container 600 as described above is configured similarly to the apparatus 400 described above and shown in FIG. 10, but does not have the protrusions 414.

Figure 14:
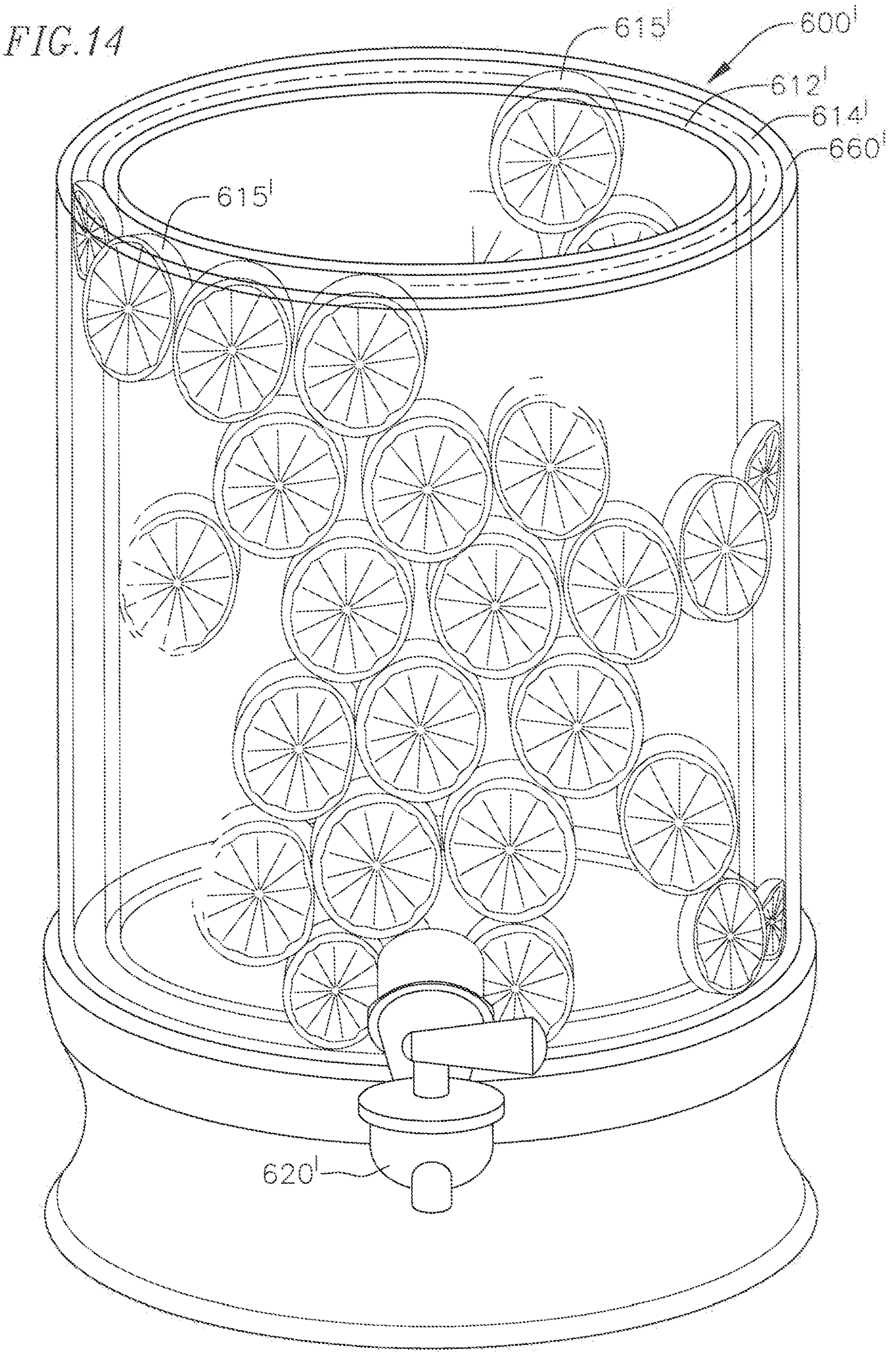
FIG. 14 is a perspective view of a container, shown holding objects, according to an exemplary embodiment of the present invention.
Figure 15A:
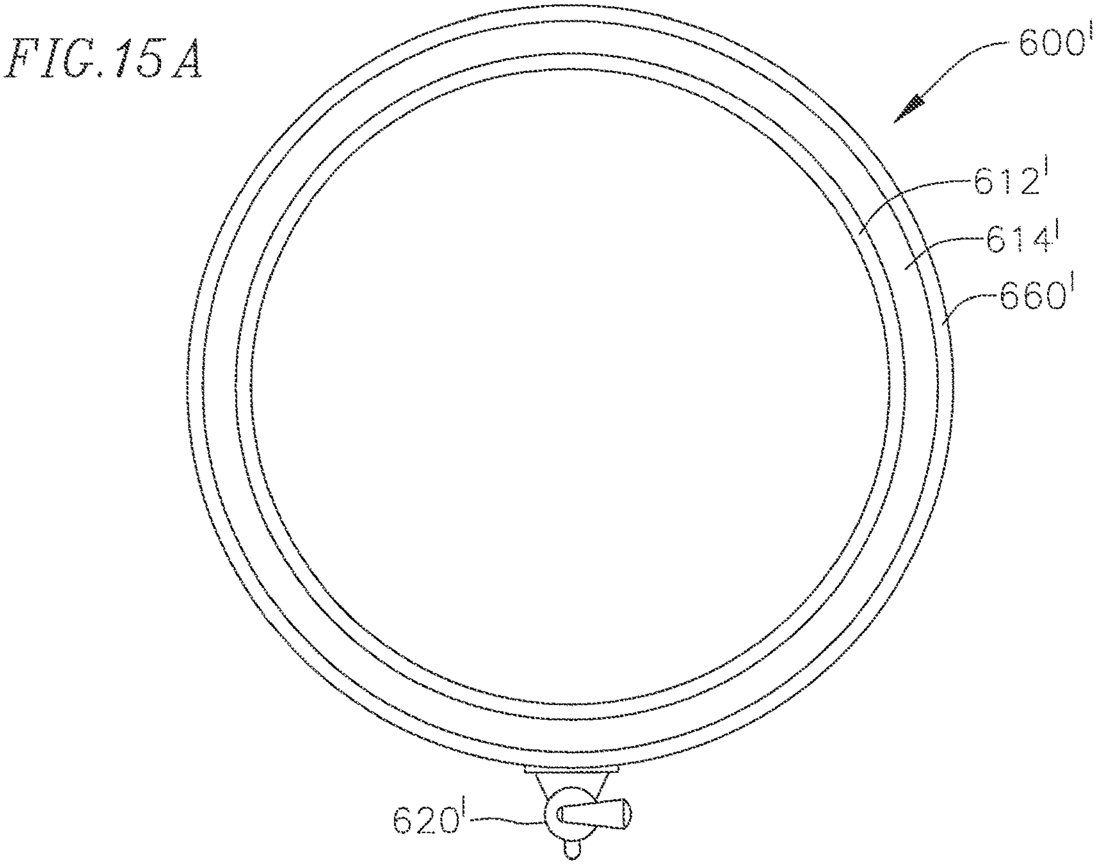
FIG. 15A is a top view of the container of FIG. 14.
Figure 15B:
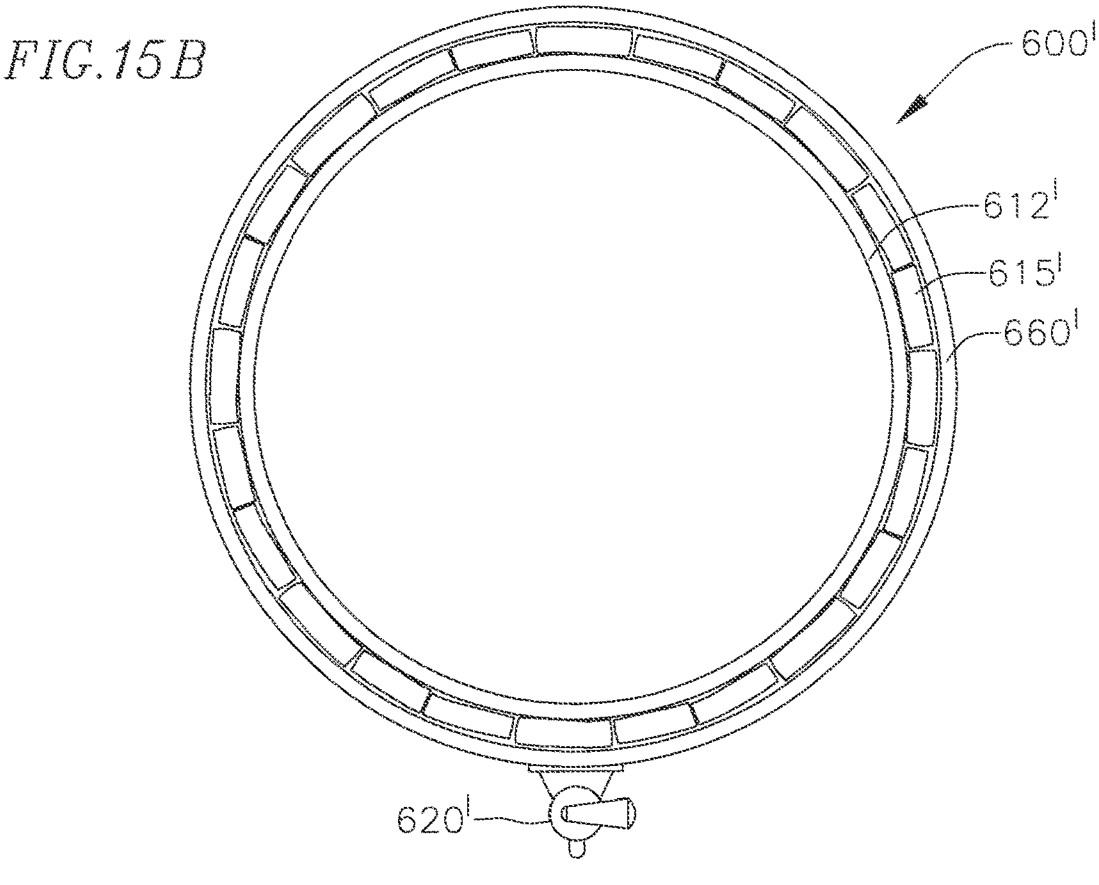
FIG. 15B is a top view of the container of FIG. 14, shown holding objects.

With reference to FIG. 14, an apparatus 612', or insert, may be made from a clear tube, such as an extruded acrylic tube, for example, or may be made from any other suitable material and may have a color other than clear. The tube may be cut to fit or substantially fit a container 600'. In one embodiment, the insert 612' may have an outer diameter that is approximately ½ inch smaller than an inner diameter of an outer wall 660' of the container 600', such that a gap 614' having a width of about approximately ½ inch is defined between the insert 612' and the outer wall 660' of the container 600'. However, the diameter of the insert 612' and the width of the gap 614' are not limited thereto, and may be any other suitable diameter and width. Further, in one embodiment, the width of the gap 614' is constant or approximately constant around a periphery of the container 600', though the present invention is not limited thereto. The insert 612' may have a same or substantially same shape as the inside of the container 600' and could be any type of shape as long as it fits inside the container 600' and performs the same function. For example, the gap 614' may have a constant width from top to bottom or may vary slightly such that the object 615' wedges rather than dropping to the bottom. For example, the width of the gap 614' may be selected such that the object 615' falls freely or may be such that the object 615' wedges and may be pushed to the bottom via a force. For example, the objects 615' may stack from the bottom or spaced from the bottom, and stay in place allowing for aesthetic designs to be created. As shown in FIGS. 14 and 15B, one or more objects 615' (e.g., lime slices) are inserted and slid down in the gap 614' between the inside of the container wall 660' and the outer wall of the insert 612'.

Figure 16A:
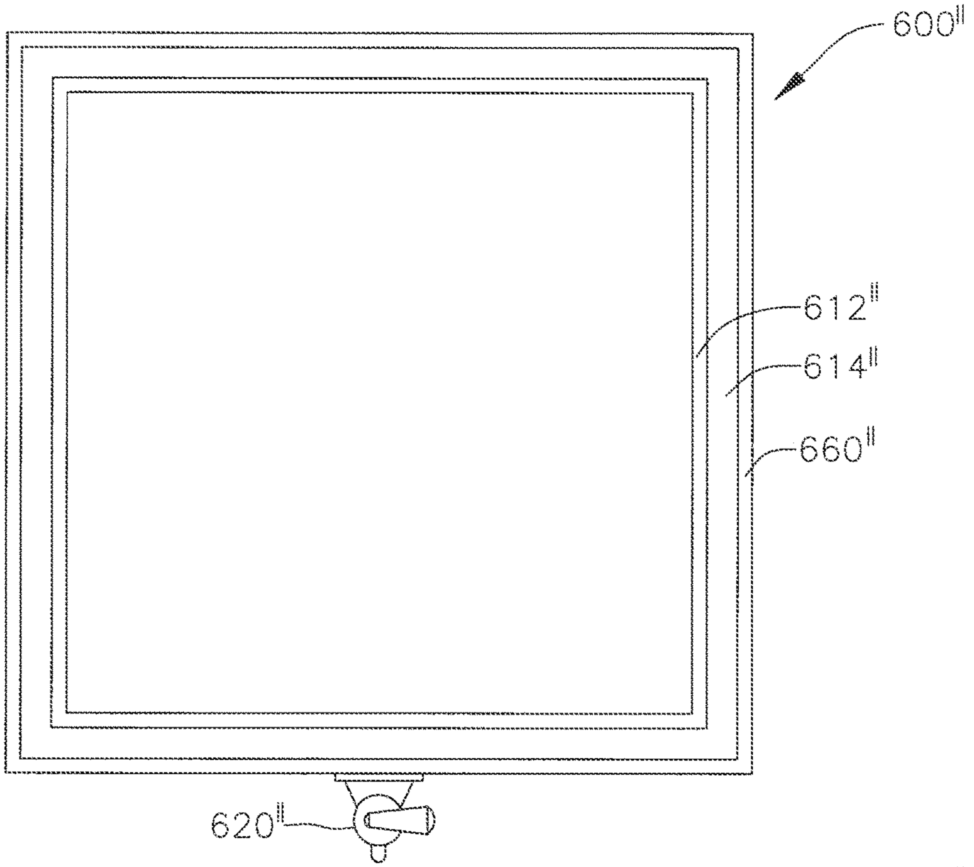
FIG. 16A is a top view of a container according to another exemplary embodiment of the present invention.
Figure 16B:
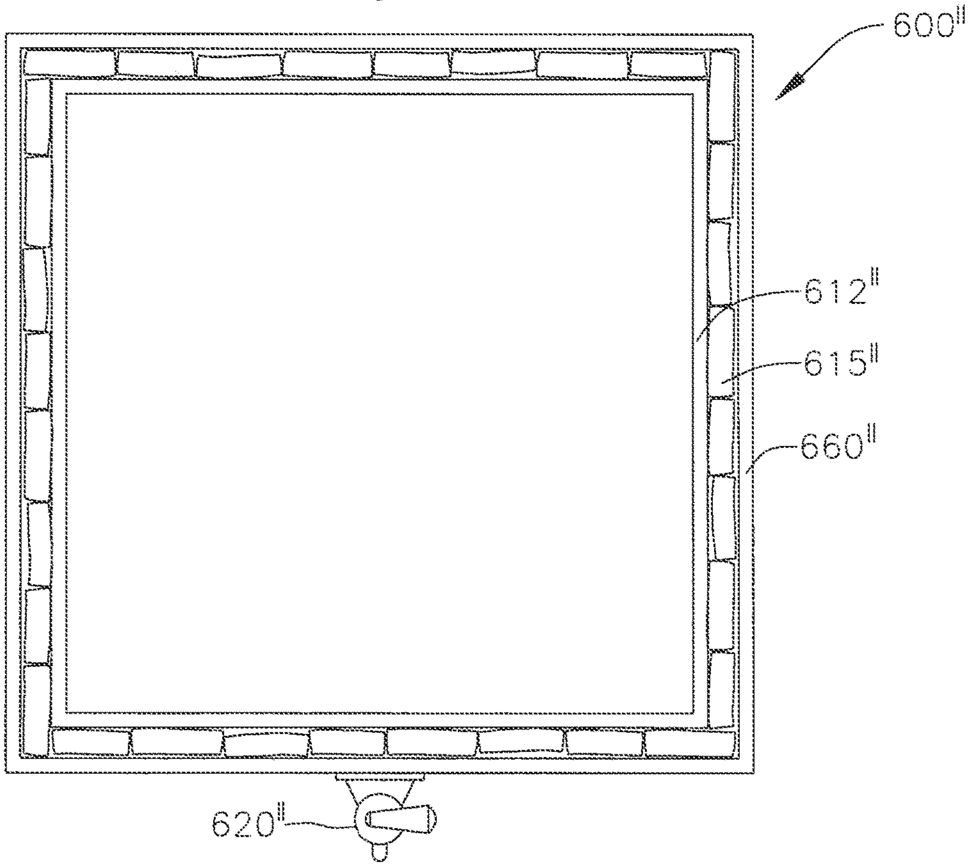
FIG. 16B is a top view of the container of FIG. 16A, shown holding objects.
Figure 17:
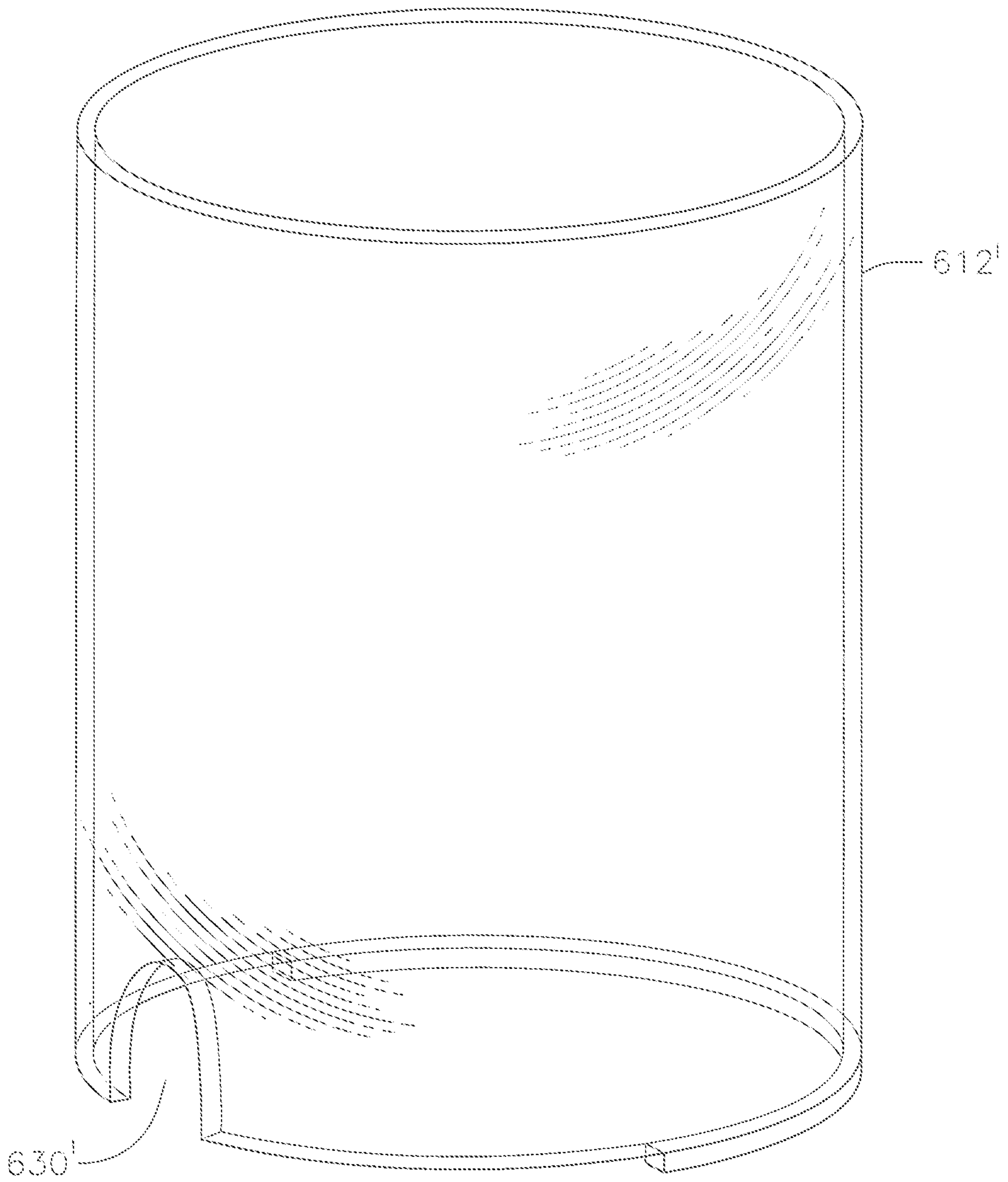
FIG. 17 is a perspective view of an apparatus for holding objects in a container according to an exemplary embodiment of the present invention.
Figure 18:
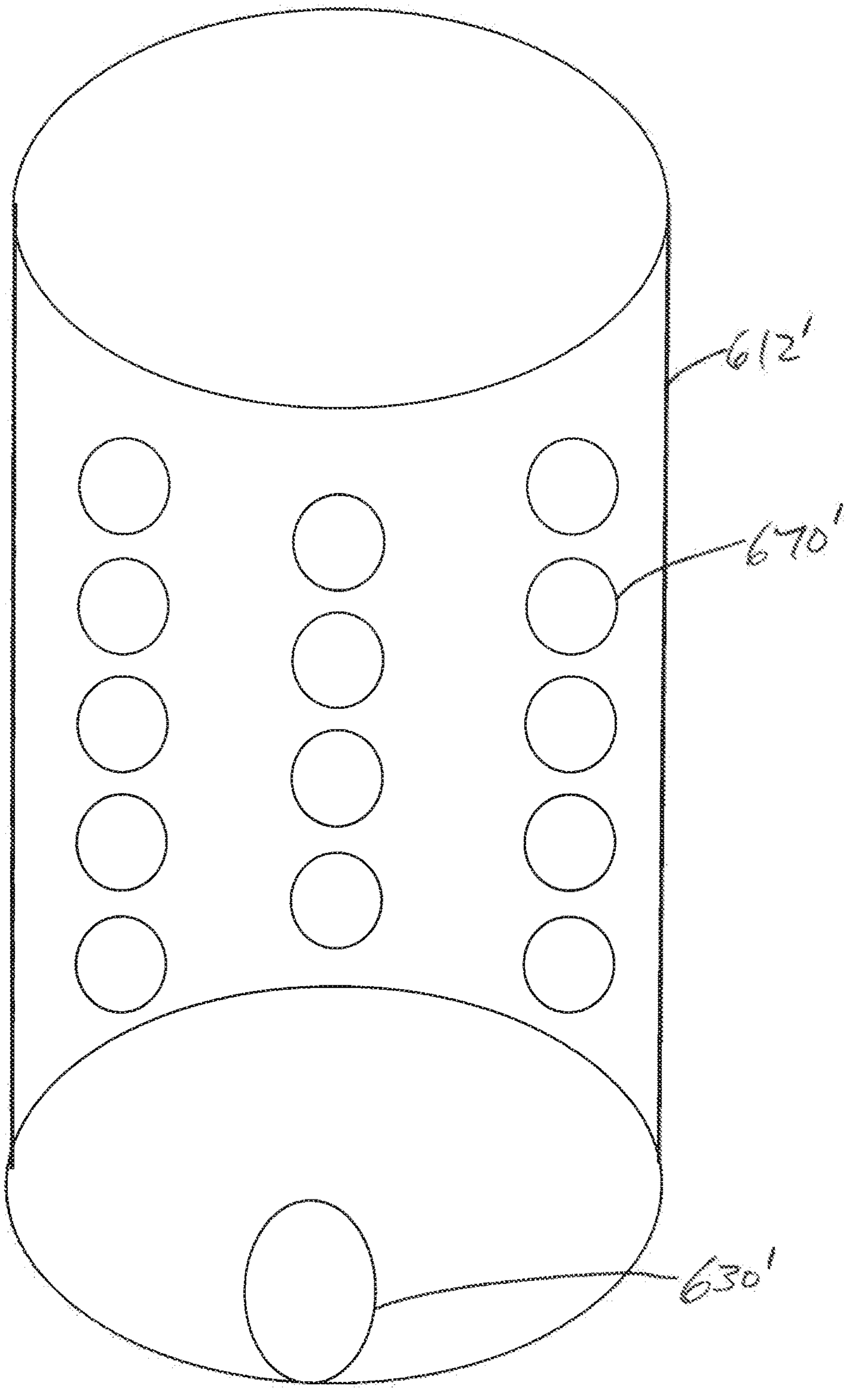
FIG. 18 is a perspective view of an apparatus for holding objects in a container according to an exemplary embodiment of the present invention.

The insert 612' may include a cutout 630' (see FIG. 17), allowing the insert 612' to fit around a spigot 620' of the container 600'. The cutout 630' also allows for the liquid to flow throughout an entire cavity of the container 600', including between the outer wall of the insert 612' and the outer wall 660' of the container 600'. Depending upon the design of the container, the cutout 630' may be omitted, so long as the liquid may enter the gap 614' between the outer wall 660' of the container 600' and the outer wall of the insert 612'. Whether the cutout 630' is included may depend upon how the liquid is dispensed out of the container 600'. Additionally or alternately, other cutouts of any suitable shape and size may be included anywhere else on the insert 612', as shown by cutouts 670' in FIG. 18, for example. As such, a region of the container 600' inside the wall of the insert 612' is in fluidic communication with the region between the wall of the insert 612' and the outer wall 660' of the container 600'. The objects 615' may be placed in the container 600' by placing them between the outer wall of the insert 612' and the outer wall 660' of the container 600'. Additional items, such as ice, may also be added inside the insert 612'. The filling of the container 600' may be performed from the top and the evacuation could be from the spigot 620'. Further, the insert 612' may be a separate component insertable into the container 600', or may be built in or integral with the container 600' itself. Further, in one embodiment, the outer wall 660' of the container 600' and the insert 612' may have a substantially circular cross-sectional shape (see FIGS. 15A and 15B). However, the present invention is not limited thereto, and the container and the insert may have any other suitable shape. For example, with reference to FIGS. 16A and 16B, in one embodiment, a container 600" includes an outer wall 660" and an insert 612" having a square or rectangular cross-sectional shape, and a gap 614" is defined therebetween in which one or more objects 615" are insertable. The container 600" may also include a spigot 620". In one embodiment, the container 600 may maintain a same diameter from the bottom to the top. The container 600' may include a lid to fit over the top of the outer wall 660'.

Figure 19:
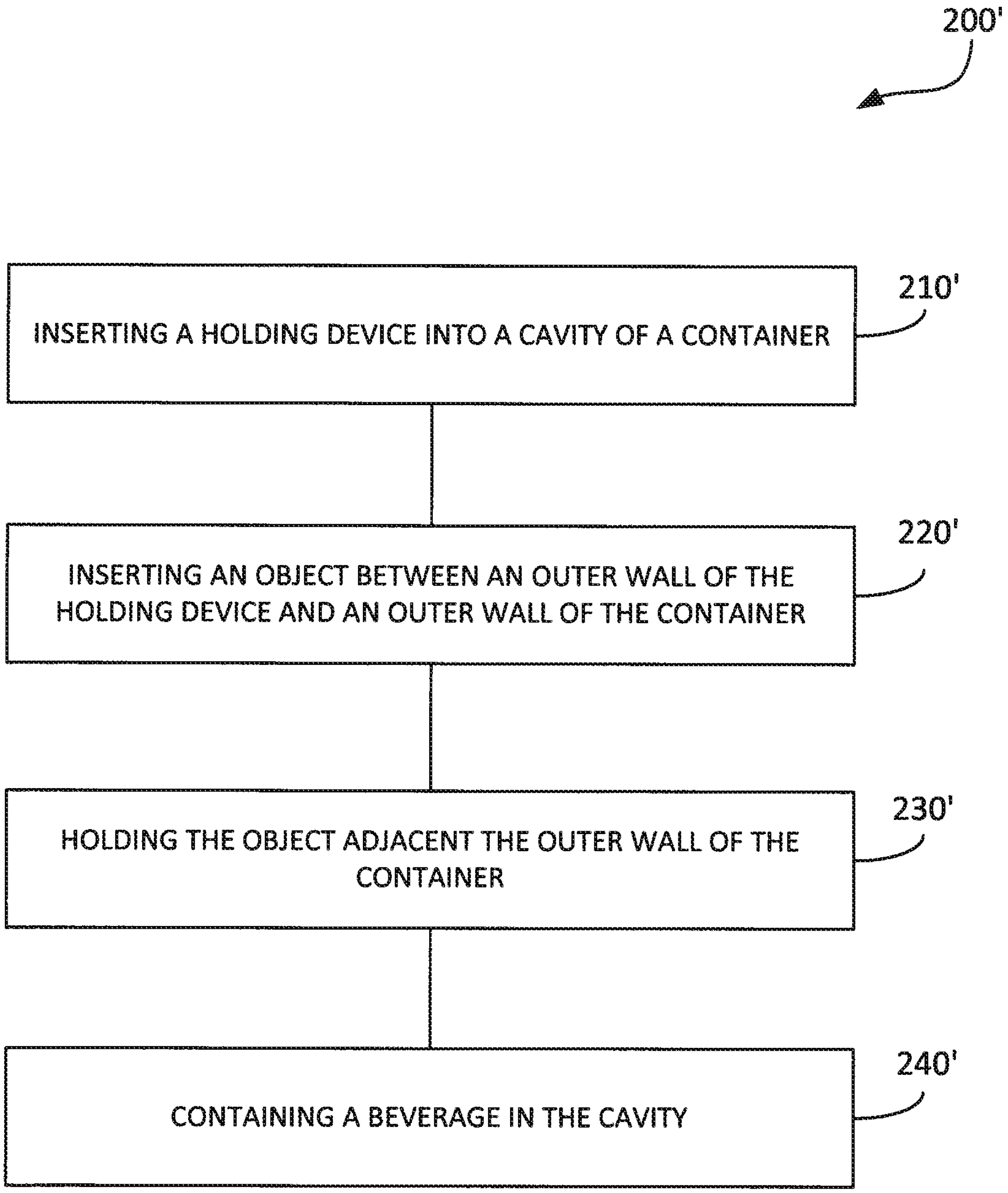
FIG. 19 is a flowchart showing tasks of a method of holding objects in a container according to an exemplary embodiment of the present invention.

With reference to FIG. 19, a method 200' of holding objects in a container is shown. While the method 200' is described herein with respect to the insert 612' and the container 600' described above and shown in FIGS. 14 through 15B, the method 200', or at least some of the tasks thereof, may be performed using an apparatus and/or a container according to other embodiments of the present invention, such as the apparatus and container shown in FIG. 13 or the apparatus and container shown in FIGS. 16A and 16B, for example.

In one embodiment, the method 200' includes a task 210' of inserting a holding device (e.g., the insert 612') through an opening and into a cavity of a container (e.g., the container 600'). Alternatively, a container may have the insert integrally formed therewith, and the task 210' may be omitted.

The method 200' further includes a task 220' of inserting one or more objects 615' between an outer wall of the insert 612' and an outer wall 660' of the container 600', such as by dropping the objects 615' into the gap 614'. The objects 615', in one embodiment, may fall into the gap 614' by gravity and stack on one another. In one embodiment, the objects 615' may fit snugly in the gap 614, and a force may be required to push the objects 615' downward. The objects 615' may be fruits or vegetables (e.g., slices of fruits or vegetables), for example, but may be any other desired objects to be held and/or displayed in the container 600'.

The method 200', in one embodiment, includes a task 230' of holding the object 615' adjacent the outer wall 660' of the container 600'. That is, the object 615' is held in place between the insert 612' and the outer wall 660' of the container 600'. In one embodiment, the outer wall 660' of the container 600' is transparent or substantially transparent, and the object 615' is visible from outside the container 600'. In one embodiment, the object 615' may be pressed against the outer wall 660' of the container 600'. For example, in one embodiment, a spring may be used to press the object 615' against the outer wall 660'. In another embodiment, for example, the insert 612' and/or the object 615' may be sized such that a width of the gap 614' is equal to or slightly less than a thickness of the object 615', such that a friction fit or interference fit is provided to snugly hold the object 615' between the insert 612' and the outer wall 660' of the container 600'.

The method 200', in one embodiment, includes a task 240' of containing a fluid (e.g., a beverage) in the cavity of the container 600'. The fluid may be poured into the cavity before or after the insert 612' is inserted into the cavity. Also, in one embodiment, the fluid is releasable from the cavity via the spigot 620' and may also be refilled.

While in one embodiment, the method 200' of holding objects in a container may include each of the tasks described above and shown in FIG. 19, in other embodiments of the present invention, in a method of holding objects in a container, one or more of the tasks described above and shown in FIG. 19 may be absent and/or additional tasks may be performed. Further, in the method 200' of holding objects in a container according to one embodiment, the tasks may be performed in the order depicted in FIG. 19. However, the present invention is not limited thereto and, in a method of holding objects in a container according to other embodiments of the present invention, the tasks described above and shown in FIG. 19 may be performed in any other suitable sequence.

Figure 20:
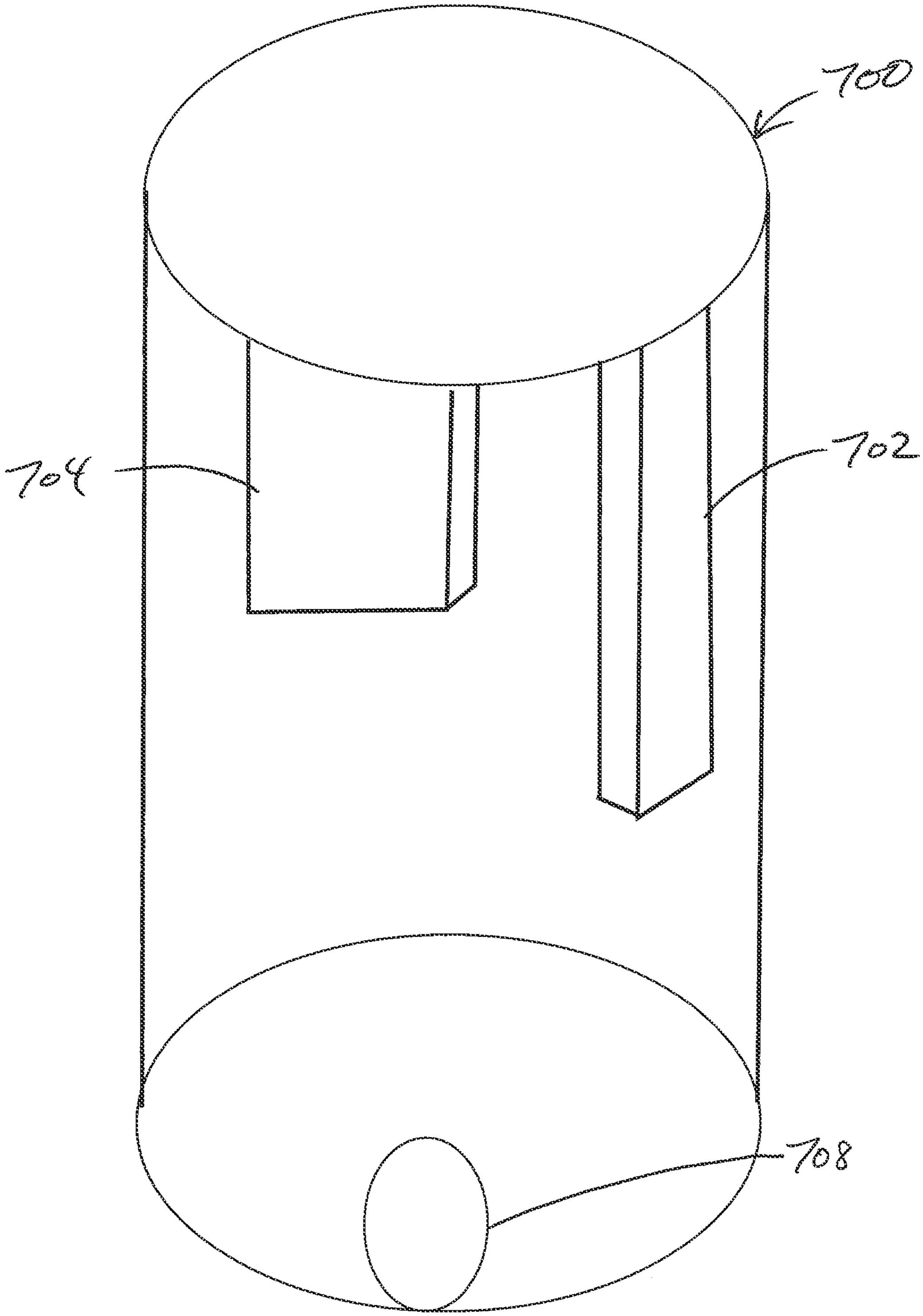
FIG. 20 is a perspective view of an apparatus for holding objects in a container according to an exemplary embodiment of the present invention.

With reference to FIG. 20, an insert 700 may include one or more pockets 702, 704. The pockets 702, 704 may be part of the insert 700, or may be attached to the insert and/or to the container. The pockets 702, 704 may allow for more control in the separation and or segregation of the objects added. For example, the pockets 702 may have a small diameter such that when making a lemon/cucumber infused water, for example, only the cucumber pieces may fit in the pockets. The depth of the pockets 702, 704 may control the number of pieces. Another pocket 704 may have a larger diameter, such as for holding a larger object (e.g., lemon slices). The insert 700 may include a cutout 708 allowing the insert 700 to fit around a spigot of a container. The cutout 708 also allows for the liquid to flow throughout the entire container, including between the outer wall of the insert 700 and the outer wall of the container.

Figure 21:
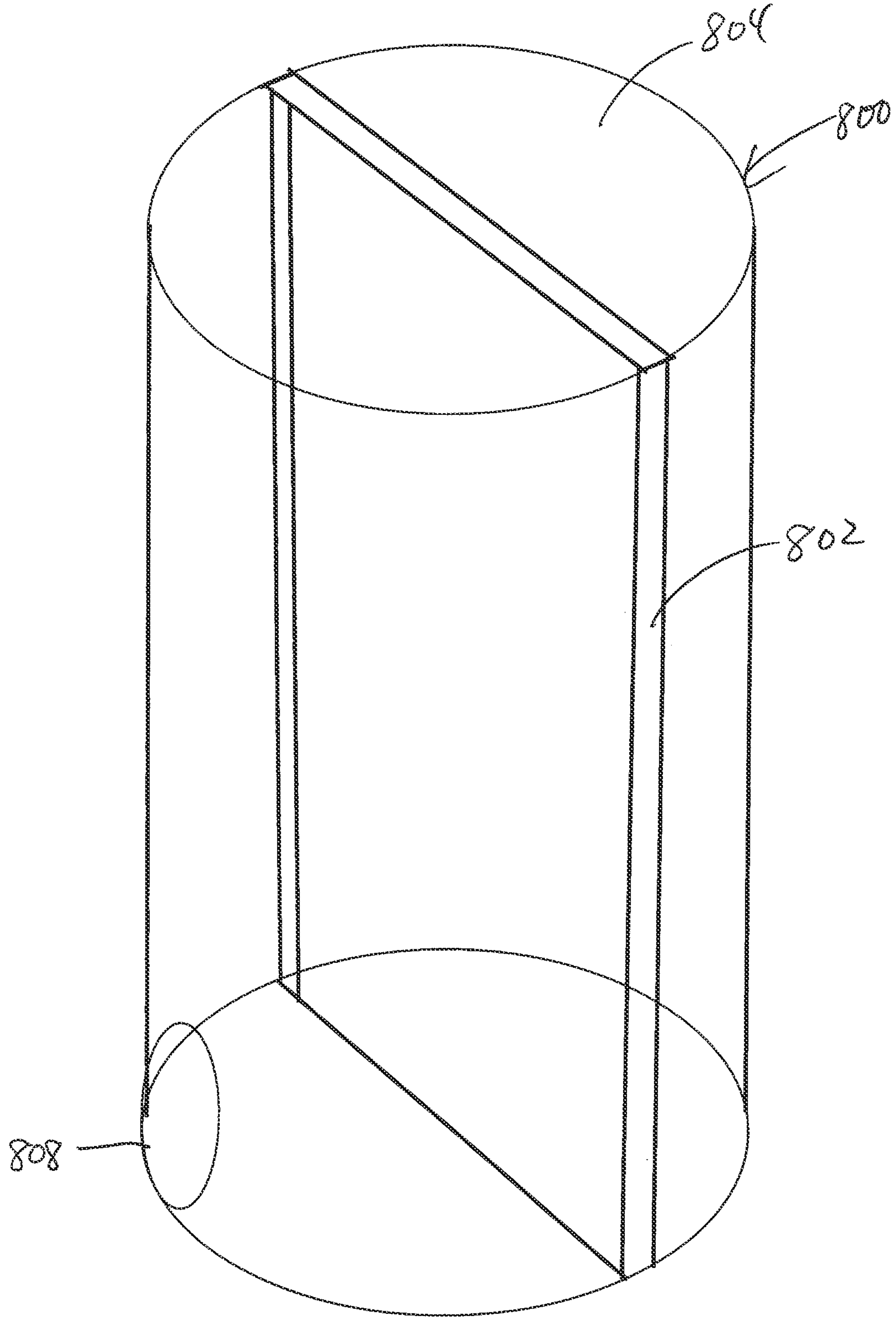
FIG. 21 is a perspective view of an apparatus for holding objects in a container according to an exemplary embodiment of the present invention.
Figure 22:
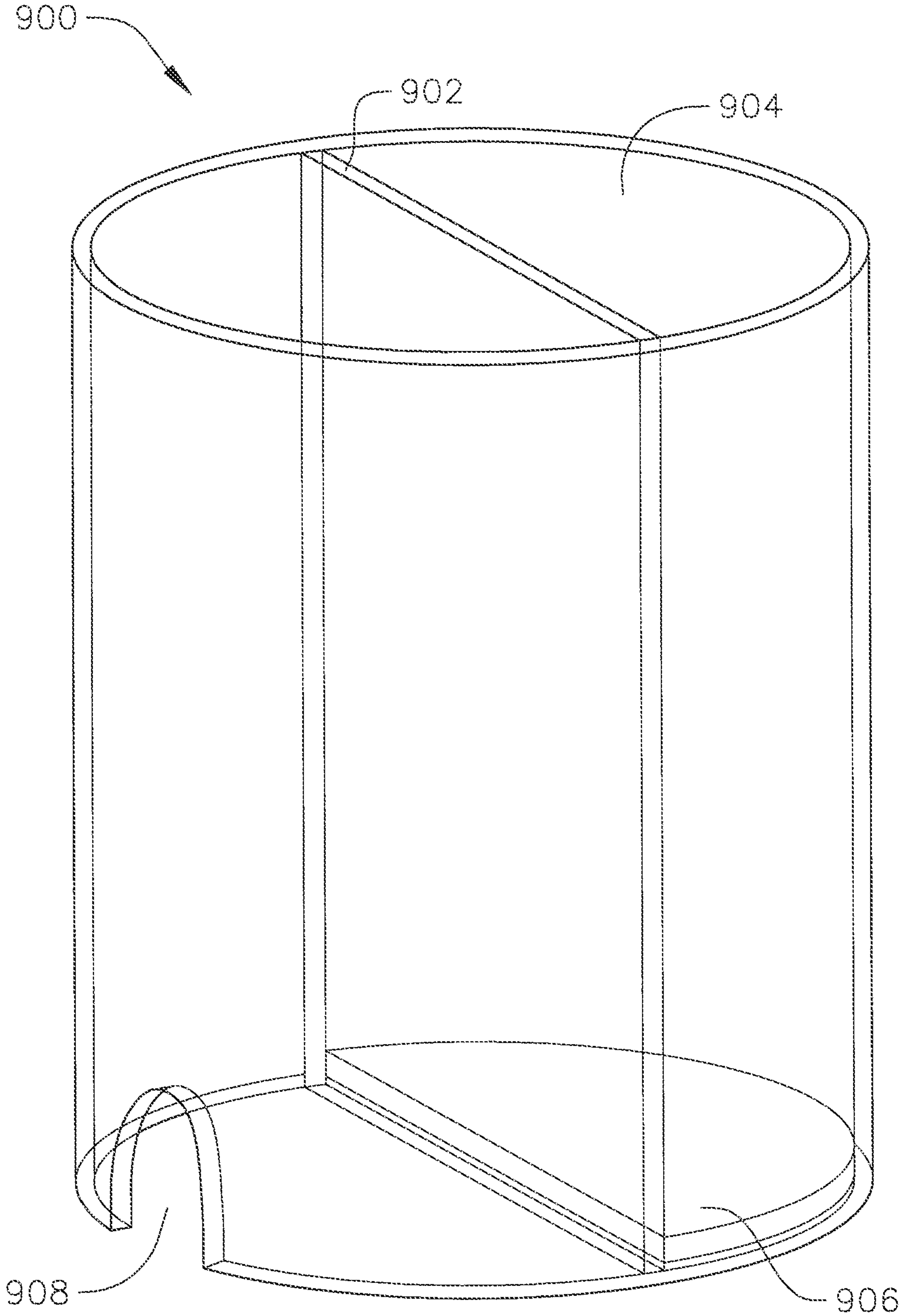
FIG. 22 shows perspective views of an apparatus for holding objects in a container according to an exemplary embodiment of the present invention.

With reference to FIGS. 21 and 22, an insert 800, 900 may include a partition 802, 902 creating a separate compartment 804, 904. The compartment 804, 904 may be used to hold ice, ice packs, or any other object to be segregated from the liquid in the container and the object between the insert and the container. This would prevent or reduce cross-contamination or dilution. Because of displacement, the compartment 804, 904, may also be used simply to reduce the amount of liquid in the container. By taking up space inside the container, the compartment 804, 904 may reduce the amount of liquid that the container can accommodate, allowing one container to accommodate different volumes of liquid based upon the size and shape of the compartment. The compartment 804, 904 may be built into the insert, or may be a separate piece, or a separate piece that attaches, clips, snaps, or slides onto the insert in any suitable manner that works in conjunction with the insert or container. The insert and compartment may also be built into the container. The compartment may be stationary or removable, such that the compartment may be swapped out with another compartment, such as another compartment containing fresh ice. The compartment 904, in one embodiment, is closed at the bottom by a shelf 906. The top of the compartment 904 may be open or closed. The insert 800, 900 may include a cutout 808, 908, allowing the insert 800, 900 to fit around a spigot of a container. The cutout 808, 908 also allows for the liquid to flow throughout the entire container, including between the outer wall of the insert 800, 900 and the outer wall of the container.

According to another embodiment of the present invention, an apparatus for holding an object in a container may include a pressure member such as a piece of plastic material that is folded and/or bent to fit in the container and configured to create a barrier to hold the object. According to another embodiment of the present invention, an apparatus for holding an object in a container may include a pressure member such as a piece of plastic material that is folded and/or bent to fit in the container and configured to create pressure to hold the object in place, such as against a wall of the container. According to another embodiment of the present invention, an apparatus may be a substantially tubular sheet that holds an object in a cavity of a container between the apparatus and a wall of a container defining the cavity, but does not substantially apply pressure to the object against the wall of the container.

According to another embodiment of the present invention, a method of holding or displaying objects in a container, which may be performed together with or separate from a holding device or apparatus such as the apparatus 10 or any of the other apparatuses (e.g., an apparatus without protrusions) described above, includes stacking objects from the bottom of a container upward along inner surfaces of the wall. That is, in one embodiment, objects, such as fruit or vegetables, may be stacked and compressed against each other to be held in place. Further, ice may be stacked with the objects and/or stacked around or between the objects, such as in a central portion of a cavity of the container. In one embodiment, layered ice and thickly sliced items are packed tightly against each other both horizontally and vertically. Ice may be used to brace the fruit, and the fruit is placed around the circumference of the container. The items are layered and stacked on top of each other, such that a fruit facade may be built up an inner surface of the wall of the jar. In one embodiment, the objects are wedged together initially around a base of the container, while adding ice to help keep the objects in place. The process is repeated up the wall of the container, layering the objects, using ice and the compression of the objects together to build and stack the design up the wall of the container.

Although the drawings and accompanying description illustrate some exemplary embodiments of an apparatus and method for holding objects in a container, it will be apparent that the novel aspects of the present invention may also be carried out by utilizing alternative structures, sizes, shapes, and/or materials in embodiments of the present invention. For example, in one alternative embodiment, an apparatus for holding objects in a container may include protrusions or similar holding portions other than the protrusions shown and described herein. For example, an apparatus for holding objects in a container according to another embodiment of the present invention may include tacks, clips, or any other suitable mechanism or device for holding the objects, as described above. Also, for example, in other embodiments, components described above may be interchanged with those of other embodiments. For example, the apparatus 400 described above and shown in FIG. 10 may be substituted for the apparatus 10 in the container 100 described above with respect to FIGS. 3-5.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A container comprising:

an outer wall defining a cavity and having an opening to an outside of the cavity; and a holding device arrangeable in the cavity such that an outer surface of a wall of the holding device is spaced apart from the outer wall and defines a gap therebetween for holding an object between the outer surface of the wall and the outer wall, wherein the gap extends to an end of the wall that is adjacent to the opening such that the object is insertable into the gap from the outside of the cavity, wherein the holding device is a separate component from the outer wall so as to be insertable into and freely movable within the cavity, and wherein the holding device is arrangeable in the cavity such that the gap has a width from the outer surface of the wall of the holding device to the outer wall that is at least as large along an entire length from a top of the cavity adjacent the opening to a bottom region of the cavity opposite the opening as a width of the gap at the bottom region of the cavity, and the gap is continuous from the top of the cavity to the bottom region of the cavity such that the object is insertable into the gap from the outside of the cavity to the bottom region of the cavity, wherein the container is configured to contain a fluid in the cavity, and a first region of the cavity that is inside the wall is in fluidic communication with a second region of the cavity defined between the wall and the outer wall when the holding device is arranged in the cavity.

2. The container of claim 1, wherein the holding device is removably receivable in the cavity through the opening of the outer wall.

3. The container of claim 1, wherein the holding device comprises an acrylic tube.

4. The container of claim 1, wherein the outer wall is substantially transparent.

5. The container of claim 1, wherein the holding device is configured to hold the object adjacent the outer wall.

6. A container comprising:

an outer wall defining a cavity and having an opening to an outside of the cavity;

a holding device arrangeable in the cavity such that an outer surface of a wall of the holding device is spaced apart from the outer wall and defines a gap therebetween, the gap having a width from the outer surface of the wall of the holding device to the outer wall; and an object comprising a fruit or a vegetable having a thickness equal to or greater than the width of the gap such that the object is configured to contact both the outer surface of the wall and the outer wall and to be snugly held in the gap by a friction fit or an interference fit at any of a plurality of positions that are spaced from one another along a direction from a top of the cavity adjacent the opening to a bottom region of the cavity opposite the opening, wherein the gap extends to an end of the wall that is adjacent to the opening such that the object is insertable into the gap from the outside of the cavity, wherein the holding device is a separate component from the outer wall so as to be insertable into and freely movable within the cavity in a state in which the object is not inserted in the gap, and wherein the holding device is arrangeable in the cavity such that the width of the gap is constant along the direction from the top of the cavity to the bottom region of the cavity, and the gap is continuous from the top of the cavity to the bottom region of the cavity such that the object is insertable into the gap from the outside of the cavity to the bottom region of the cavity, wherein the container is configured to contain a fluid in the cavity, and wherein the holding device has at least one opening through the wall such that a first region of the cavity that is inside the wall is in fluidic communication with a second region of the cavity defined between the wall and the outer wall.

7. The container of claim 6, wherein the outer wall includes a sealable spigot that is openable to release the fluid from the cavity, and wherein the holding device has an opening through the wall adjacent the spigot.

8. The container of claim 6, wherein the outer wall is substantially transparent.

9. The container of claim 6, wherein the object comprises a plurality of objects stacked on one another and held adjacent the outer wall.

10. A method of holding an object in a container, the container including an outer wall defining a cavity of the container and having an opening to an outside of the cavity, and a holding device arranged in the cavity such that an outer surface of a wall of the holding device is spaced apart from the outer wall and defines a gap therebetween extending to an end of the wall that is adjacent to the opening, wherein the gap has a width from the outer surface of the wall of the holding device to the outer wall along a direction from a top of the cavity adjacent the opening to a bottom region of the cavity opposite the opening, wherein the container is configured to contain a fluid in the cavity, and wherein the holding device has at least one opening through the wall such that a first region of the cavity that is inside the wall is in fluidic communication with a second region of the cavity defined between the wall and the outer wall, the method comprising:

inserting a plurality of objects into the gap between the outer surface of the wall and the outer wall from the outside of the cavity, each of the plurality of objects having a thickness equal to or greater than the width of the gap such that each of the plurality of objects is configured to contact both the outer surface of the wall and the outer wall and to be snugly held in the gap by a friction fit or an interference fit and spaced apart from an adjacent one of the plurality of objects along the direction from the top of the cavity to the bottom region of the cavity, wherein the holding device is a separate component from the outer wall so as to be insertable into and freely movable within the cavity in a state in which the plurality of objects is not inserted in the gap, and wherein the holding device is arrangeable in the cavity such that the gap is continuous from the top of the cavity to the bottom region of the cavity such that at least one of the plurality of objects is insertable into the gap from the outside of the cavity to the bottom region of the cavity.

11. The method of claim 10, further comprising holding the plurality of objects adjacent the outer wall of the container.

12. The method of claim 10, further comprising pressing the plurality of objects against the outer wall of the container.

13. The method of claim 10, further comprising containing a beverage in the cavity, wherein the plurality of objects comprises at least one of a fruit or a vegetable.

14. The method of claim 10, wherein inserting the plurality of objects in the gap comprises stacking the plurality of objects in the gap, and wherein the container is substantially transparent, and objects of the plurality of objects are visible from the outside of the container around a periphery thereof.

15. The container of claim 6, wherein the object is pressed against the outer wall.

16. The container of claim 9, wherein objects of the plurality of objects are stacked on one another in a vertical direction extending toward the opening of the outer wall.

17. The container of claim 6, wherein the container is configured to contain a beverage in the cavity, and the object is a food product.

18. The container of claim 6, wherein the object is configured to be spaced apart from a bottom of the gap.

19. The container of claim 6, wherein the object is configured to be snugly held against the outer surface of the wall and the outer wall with an interference fit.

20. The container of claim 1, wherein the width of the gap is constant from the top of the cavity to the bottom region of the cavity along a direction from the top of the cavity to the bottom region of the cavity.

21. The container of claim 6, wherein the object comprises a plurality of objects, each having a thickness equal to or greater than the width of the gap such that the object is configured to contact both the outer surface of the wall and the outer wall and to be snugly held in the gap by a friction fit or an interference fit and spaced apart from an adjacent one of the plurality of objects along the direction from the top of the cavity to the bottom region of the cavity.

22. A container comprising:

an outer wall defining a cavity and having an opening to an outside of the cavity;

a holding device arrangeable in the cavity such that an outer surface of a wall of the holding device is spaced apart from the outer wall and defines a gap therebetween, the gap having a width from the outer surface of the wall of the holding device to the outer wall; and a plurality of objects, each having a thickness equal to or greater than the width of the gap such that each of the plurality of objects is configured to contact both the outer surface of the wall and the outer wall and to be snugly held in the gap by a friction fit or an interference fit and spaced apart from an adjacent one of the plurality of objects along a direction from a top of the cavity adjacent the opening to a bottom region of the cavity opposite the opening, wherein the gap extends to an end of the wall that is adjacent to the opening such that each of the plurality of objects is insertable into the gap from the outside of the cavity, wherein the holding device is a separate component from the outer wall so as to be insertable into and freely movable within the cavity in a state in which the plurality of objects is not inserted in the gap, and wherein the holding device is arrangeable in the cavity such that the gap is continuous from the top of the cavity to the bottom region of the cavity such that at least one of the plurality of objects is insertable into the gap from the outside of the cavity to the bottom region of the cavity, wherein the container is configured to contain a fluid in the cavity, and wherein the holding device has at least one opening through the wall such that a first region of the cavity that is inside the wall is in fluidic communication with a second region of the cavity defined between the wall and the outer wall.

23. The container of claim 22, wherein each of the plurality of objects is a fruit slice or a vegetable slice configured to be snugly held against the outer surface of the wall by an interference fit.

24. The container of claim 6, wherein the outer wall includes a sealable spigot that is openable to release the fluid from the cavity, and the holding device has a first opening through the wall to fit around the spigot to release the fluid from the first region of the cavity, and the first region of the cavity is in fluidic communication with the second region of the cavity through the first opening of the holding device.

25. The container of claim 1, wherein the object has a thickness corresponding to the width of the gap such that the object is configured to contact both the outer surface of the wall and the outer wall.

26. The container of claim 6, wherein the object is insertable into the gap through the opening so as to be snugly held in the gap by the friction fit or the interference fit while being inserted.

27. The container of claim 22, wherein each of the plurality of objects is insertable into the gap through the opening so as to be snugly held in the gap by the friction fit or the interference fit while being inserted.

28. The container of claim 1, wherein the outer wall includes a sealable spigot that is openable to release the fluid from the cavity, and the holding device has a first opening through the wall to fit around the spigot to release the fluid from the first region of the cavity, and the first region of the cavity is in fluidic communication with the second region of the cavity through the first opening of the holding device when the holding device is arranged in the cavity.

* * * * *